United States Patent
Teraya et al.

(10) Patent No.: US 9,725,085 B2
(45) Date of Patent: Aug. 8, 2017

(54) HYBRID VEHICLE WITH VARIABLE VALVE TIMING FAILURE DETECTION WITH CONSEQUENT REDUCTION OF ENGINE OUTPUT RANGE RANGE AND INCREASE OF THE STATE OF CHARGE

(71) Applicant: Toyota Jidosha Kabushiki Kaisha, Toyota-shi Aichi-ken (JP)

(72) Inventors: Ryuta Teraya, Okazaki (JP); Toshikazu Kato, Toyota (JP); Yoshikazu Asami, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/117,778

(22) PCT Filed: Dec. 17, 2014

(86) PCT No.: PCT/JP2014/006287
§ 371 (c)(1),
(2) Date: Aug. 10, 2016

(87) PCT Pub. No.: WO2015/121909
PCT Pub. Date: Aug. 20, 2015

(65) Prior Publication Data
US 2016/0355176 A1    Dec. 8, 2016

(30) Foreign Application Priority Data
Feb. 12, 2014  (JP) .................. 2014-024533

(51) Int. Cl.
*B60W 10/06*    (2006.01)
*B60W 10/08*    (2006.01)
(Continued)

(52) U.S. Cl.
CPC .............. *B60W 20/50* (2013.01); *B60K 6/365* (2013.01); *B60K 6/445* (2013.01); *B60W 10/06* (2013.01);
(Continued)

(58) Field of Classification Search
CPC ....... B60K 6/365; B60K 6/445; B60W 10/06; B60W 10/08; B60W 20/50;
(Continued)

(56) References Cited

U.S. PATENT DOCUMENTS

| 2004/0035391 | A1 | 2/2004 | Fuwa |
| 2004/0118367 | A1 | 6/2004 | Ezaki et al. |
| 2005/0229880 | A1 | 10/2005 | Hashizume |
| 2007/0251345 | A1 | 11/2007 | Kriebernegg et al. |
| 2012/0132163 | A1 | 5/2012 | Shoji et al. |

(Continued)

FOREIGN PATENT DOCUMENTS

| JP | 09242519 A | 9/1997 |
| JP | 2000-034913 A | 2/2000 |

(Continued)

*Primary Examiner* — Marthe Marc-Coleman
(74) *Attorney, Agent, or Firm* — Dinsmore & Shohl LLP

(57) ABSTRACT

An engine has a variable valve actuation device for controlling an actuation characteristic of an intake valve that is an amount of lifting the intake valve and/or a working angle on the intake valve. When the intake valve, having the actuation characteristic (or lifted in an amount and/or worked by a working angle), as controlled by the variable valve actuation device, has the actuation characteristic fixed (YES in S120), a range applied to set therewithin an output that the engine is required to provide is limited to be narrower and a power storage device's controlled target SOC is raised to be higher (S150, S160, S170) than when said actuation characteristic is not fixed (NO in S120).

12 Claims, 18 Drawing Sheets

(51) Int. Cl.
*B60K 6/445* (2007.10)
*B60W 20/50* (2016.01)
*B60K 6/365* (2007.10)

(52) U.S. Cl.
CPC ......... *B60W 10/08* (2013.01); *B60W 2510/06* (2013.01); *B60W 2510/0604* (2013.01); *B60W 2510/0685* (2013.01); *B60W 2520/10* (2013.01); *B60W 2540/10* (2013.01); *B60W 2710/0677* (2013.01); *B60W 2710/244* (2013.01); *Y02T 10/6239* (2013.01); *Y02T 10/6286* (2013.01)

(58) Field of Classification Search
CPC ..... B60W 2710/0677; B60W 2540/10; B60W 2510/0685; B60W 2510/0604; B60W 2510/06; B60W 2520/10; B60W 2710/244; Y02T 10/6286; Y02T 10/6239
USPC .............. 701/22; 180/65.265, 65.28, 65.285; 903/902
See application file for complete search history.

(56) References Cited

U.S. PATENT DOCUMENTS

2013/0306012 A1* 11/2013 Hamamoto et al. ........................... F02D 13/0238
123/90.15
2016/0096429 A1 4/2016 Imafuku et al.

FOREIGN PATENT DOCUMENTS

| JP | 2004-084521 A | 3/2004 |
| JP | 2004-183610 A | 7/2004 |
| JP | 2005-299594 A | 10/2005 |
| JP | 2006-001531 A | 1/2006 |
| JP | 2007-132326 A | 5/2007 |
| JP | 2008-025550 A | 2/2008 |
| JP | 2009-190525 A | 8/2009 |
| JP | 2009-202662 A | 9/2009 |
| JP | 2012-117376 A | 6/2012 |
| JP | 2013-053610 A | 3/2013 |
| JP | 2016-074342 A | 5/2016 |

* cited by examiner ically to a hybrid vehicle including an internal combustion engine provided with a variable valve actuation device for varying an actuation characteristic of an intake valve.

HYBRID VEHICLE WITH VARIABLE VALVE TIMING FAILURE DETECTION WITH CONSEQUENT REDUCTION OF ENGINE OUTPUT RANGE RANGE AND INCREASE OF THE STATE OF CHARGE

CROSS-REFERENCE TO RELATED APPLICATIONS

This application is a National Stage of International Application PCT/JP2014/006287 filed on Dec. 17, 2014, which claims priority to Japanese Patent Application No. 2014-024533, filed Feb. 12, 2014, the entire contents of which are hereby incorporated by reference.

TECHNICAL FIELD

The present disclosure relates to a hybrid vehicle, and more specifically to a hybrid vehicle including an internal combustion engine provided with a variable valve actuation device for varying an actuation characteristic of an intake valve.

BACKGROUND ART

An internal combustion engine is known that is provided with a variable valve actuation device capable of varying an actuation characteristic of an intake valve. Furthermore, one such variable valve actuation device is known to allow an intake valve to be lifted in a varying amount and/or worked by a varying working angle (see PTLs 1-10).

For example, Japanese Patent Laying-Open No. 2009-202662 (PTL 1) discloses a hybrid vehicle having mounted therein an internal combustion engine having a variable valve actuation device allowing an intake valve to be lifted in an amount varying in magnitude and to be worked by a working angle (or an operation angle) varying in magnitude. PTL 1 discloses that when the hybrid vehicle has the variable valve actuation device diagnosed to have failed, and the vehicle is currently either travelling or stopped, the engine is prohibited from stopping.

Furthermore, Japanese Patent Laying-Open No. 2004-084521 (PTL 2) describes that when a means for varying timing when to open/close an intake valve and/or a means for varying a working angle on the intake valve are/is detected to have failed, the timing and/or the working angle are/is fixed and a throttle valve is also angularly controlled depending on the target intake air volume to allow for fail-safe.

CITATION LIST

Patent Literature

[PTL 1] Japanese Patent Laying-Open No. 2009-202662
[PTL 2] Japanese Patent Laying-Open No. 2004-084521
[PTL 3] Japanese Patent Laying-Open No. 2005-299594
[PTL 4] Japanese Patent Laying-Open No. 2000-034913
[PTL 5] Japanese Patent Laying-Open No. 2009-190525
[PTL 6] Japanese Patent Laying-Open No. 2004-183610
[PTL 7] Japanese Patent Laying-Open No. 2013-053610
[PTL 8] Japanese Patent Laying-Open No. 2008-025550
[PTL 9] Japanese Patent Laying-Open No. 2012-117376
[PTL 10] Japanese Patent Laying-Open No. 9-242519

SUMMARY

Technical Problem

PTL 1 describes that once the variable valve actuation device has failed, the internal combustion engine is prohibited from stopping, as has been described above, and in that condition, when the vehicle is accelerated and thus travels, the vehicle travels via an output of the engine and that of a motor, whereas when the vehicle travels in a steady state, the vehicle travels via the output of the engine alone. Furthermore, when the vehicle is decelerated and thus travels, the vehicle has the motor regeneratively driven to generate electrical power, and when the vehicle stops, the vehicle has engine speed controlled to a prescribed speed and an excessive torque is used to drive the motor to generate electrical power.

However, when the variable valve actuation device has failed or the like and accordingly, the intake valve has its actuation characteristic fixed (or is lifted in a fixed amount and/or worked by a fixed working angle), then, in accordance with the fixed actuation characteristic, a maximum output that the engine can output may be reduced and/or a minimum output that the engine can output may be increased. This may result in the engine providing an output excessively more or insufficiently less than an output that the engine is required to provide in accordance with an allocation of an output that is made in the hybrid vehicle as a whole.

In that case, to match the output of the hybrid vehicle as a whole with the required value, the excess/shortage of the engine's output must be compensated for by operating the motor to output a positive or negative torque via charging/discharging a power storage device (or battery). If this happens frequently, the power storage device (or battery) may have a state of charge (SOC) increased (when the engine provides an excessive output) or reduced (when the engine provides an insufficient output). The reduced SOC invites impaired vehicular acceleration performance, and an excessively reduced SOC may result in the vehicle being no longer capable of travelling. An excessively increased SOC prevents the power storage device from absorbing electric power generated when the engine's rotation is decelerated as the engine stops, and accordingly, the engine is idled for an increased period of time, which may result in impaired fuel efficiency.

The present disclosure has been made to address such an issue, and an object of the present disclosure is that when a vehicle including an internal combustion engine having a variable valve actuation device to control an intake valve to be lifted in a controlled amount and/or worked by a controlled working angle, has the amount and/or the angle fixed, the internal combustion engine is operated to avoid excessively increased/decreased SOC that would lead to impaired fuel efficiency, incapability of travelling and the like preventing the vehicle from continuing to travel.

Solution to Problem

The present disclosure provides a hybrid vehicle comprising: an internal combustion engine having a variable valve actuation device for controlling an actuation characteristic of an intake valve, the actuation characteristic being an amount of lifting the intake valve and/or a working angle on the intake valve; a detector configured to detect the actuation characteristic controlled by the variable valve actuation device; a rotating electric machine configured to generate vehicular driving force; a power storage device configured to store electric power for driving the rotating electric machine; and a control device. The control device is configured such that when the detector detects that the actuation characteristic is fixed the control device sets a range that is applied to set therewithin an output that the internal combustion engine is required to provide to be narrower than when the actuation characteristic is not fixed, and the control device controls the SOC of the power storage device to be higher than when the actuation characteristic is not fixed.

In the present hybrid vehicle when the variable valve actuation device has failed or is at a low temperature and thus has increased friction or the like, and accordingly the intake valve having an actuation characteristic (or lifted in an amount and/or worked by a working angle, as) controlled by the variable valve actuation device has the actuation characteristic (or the amount and/or the angle) fixed, the internal combustion engine's output is controlled with a maximum value and/or a minimum value limited in accordance with the fixed actuation characteristic, and correspondingly, an output that the internal combustion engine is required to provide can be set within a narrowed range and the power storage device's SOC can also be controlled to be high in advance in the event that the internal combustion engine provides an output insufficiently for a high output range. Thus, while the intake valve has the actuation characteristic fixed, the internal combustion engine can be operated to avoid excessively increased/decreased SOC that would lead to impaired fuel efficiency, incapability of travelling and the like preventing the vehicle from continuing to travel.

When the actuation characteristic is fixed with at least one of the amount of lifting the intake valve and the working angle on the intake valve being smaller than a first prescribed value, the control device may set the range to be narrower and controls the SOC to be higher than when the actuation characteristic is not fixed. When the actuation characteristic is fixed with the at least one of the amount of lifting the intake valve and the working angle on the intake valve being larger than the first prescribed value, the control device may determine the range and controls the SOC to be equivalent to those applied when the actuation characteristic is not fixed.

Thus, only when the intake valve has the actuation characteristic fixed in a range for which the internal combustion engine may provide an output within a narrowed range, an output that the internal combustion engine is required to provide is set within a narrowed range and the SOC is also controlled to be high in advance. This allows the internal combustion engine to be used more effectively and can also increase a capacity to accept regenerated electric power, and the vehicle can thus continue to travel while minimizing impaired fuel efficiency.

When the actuation characteristic is fixed with the at least one of the amount of lifting the intake valve and the working angle on the intake valve being smaller than a second prescribed value smaller than the first prescribed value, the control device may set the range to be further narrower and controls the SOC to be further higher than when the actuation characteristic is fixed in a state between the first and second prescribed values.

This can alleviate limiting the range and raising the SOC when the actuation characteristic is fixed with the amount and/or the angle between the first and second prescribed values. This allows the internal combustion engine to be used more effectively and can also increase a capacity to accept regenerated electric power, and the vehicle can thus continue to travel while minimizing impaired fuel efficiency.

The hybrid vehicle may further comprise an exhaust gas recirculation device provided in the internal combustion engine and including a recirculation valve for recirculating a portion of exhaust gas of the internal combustion engine via the recirculation valve to an intake side of the internal combustion engine. When the actuation characteristic is fixed with the at least one of the amount of lifting the intake valve and the working angle on the intake valve being larger than the first prescribed value, the control device determines the range and controls the SOC to be equivalent to those applied when the actuation characteristic is not fixed, and the control device also holds closed the recirculation valve of the exhaust gas recirculation device.

When the internal combustion engine including the variable valve actuation device to control the intake valve to have an actuation characteristic (or be lifted in an amount and/or worked by a working angle), that is provided with an exhaust gas recirculation device, has the actuation characteristic fixed, the exhaust gas recirculation device can be prevented from operating to impair combustibility.

The present hybrid vehicle may have the variable valve actuation device configured to be capable of switching the actuation characteristic of the intake valve to any one of a first characteristic, a second characteristic allowing the amount of lifting the intake valve and/or the working angle on the intake valve to be larger than when the actuation characteristic is the first characteristic, and a third characteristic allowing the amount and/or the angle to be larger than when the actuation characteristic is the second characteristic. When the detector detects that the actuation characteristic is fixed at one of the first and second characteristics, the control device sets the range to be narrower and controls the SOC to be higher than when the actuation characteristic is not fixed.

Thus, when a vehicle including an internal combustion engine having an intake valve with an actuation characteristic (or lifted in an amount and/or worked by a working angle, as) controlled by a variable valve actuation device in three levels, has the actuation characteristic (or the amount and/or the angle) fixed, the internal combustion engine can be operated to avoid excessively increased/decreased SOC that would lead to impaired fuel efficiency, incapability of travelling and the like preventing the vehicle from continuing to travel.

When the actuation characteristic is fixed at the third characteristic, the control device may determine the range and controls the SOC to be equivalent to those applied when the actuation characteristic is not fixed. Alternatively, when the actuation characteristic is fixed at the first characteristic, the control device sets the range to be further narrower and controls the SOC to be further higher than when the actuation characteristic is fixed at the second characteristic. When the intake valve having an actuation characteristic (or lifted in an amount and/or worked by a working angle, as) controlled by a variable valve actuation device in three levels, has the actuation characteristic (or the amount and/or the angle) fixed at some actuation characteristic, limiting the range and raising the SOC can be alleviated or avoided depending on that actuation characteristic. The vehicle can thus continue to travel while minimizing impaired fuel efficiency.

Furthermore, the hybrid vehicle may further comprise an exhaust gas recirculation device provided in the internal combustion engine. When the actuation characteristic is fixed at the third characteristic, the control device determines the range and controls the SOC to be equivalent to those applied when the actuation characteristic is not fixed, and the control device also holds closed the recirculation valve of the exhaust gas recirculation device.

Thus, when a vehicle including an internal combustion engine that is provided with a variable valve actuation device to control an intake valve to have an actuation characteristic (or be lifted in an amount and/or worked by a working angle) in three levels, and an exhaust gas recirculation device, has the actuation characteristic (or the amount and/or the angle) fixed, the exhaust gas recirculation device can be prevented from operating to impair combustibility.

Furthermore, the present hybrid vehicle may have the variable valve actuation device configured to be capable of switching the actuation characteristic of the intake valve to any one of a first characteristic and a second characteristic allowing the amount and/or the angle to be larger than when the actuation characteristic is the first characteristic. When the detector detects that the actuation characteristic is fixed at the first characteristic, the control device sets the range to be narrower and controls the SOC to be higher than when the actuation characteristic is not fixed.

Thus, when a vehicle including an internal combustion engine having an intake valve with an actuation characteristic (or lifted in an amount and/or worked by a working angle, as) controlled by a variable valve actuation device in two levels, has the actuation characteristic (or the amount and/or the angle) fixed, the internal combustion engine can be operated to avoid excessively increased/decreased SOC that would lead to impaired fuel efficiency, incapability of travelling and the like preventing the vehicle from continuing to travel.

When the actuation characteristic is fixed at the second characteristic, the control device may determine the range and controls the SOC to be equivalent to those applied when the actuation characteristic is not fixed.

When the intake valve having an actuation characteristic (or lifted in an amount and/or worked by a working angle, as) controlled by a variable valve actuation device in two levels, has the actuation characteristic (or the amount and/or the angle) fixed at some actuation characteristic, limiting the range and raising the SOC can be alleviated or avoided depending on that actuation characteristic. The vehicle can thus continue to travel while minimizing impaired fuel efficiency.

Alternatively, the hybrid vehicle further comprises an exhaust gas recirculation device provided in the internal combustion engine. When the actuation characteristic is fixed at the second characteristic, the control device determines the range and controls the SOC to be equivalent to those applied when the actuation characteristic is not fixed, and the control device also holds closed the recirculation valve of the exhaust gas recirculation device.

Thus, when a vehicle including an internal combustion engine that is provided with a variable valve actuation device to control an intake valve to have an actuation characteristic (or be lifted in an amount and/or worked by a working angle) in two levels, and an exhaust gas recirculation device, has the actuation characteristic (or the amount and/or the angle) fixed, the exhaust gas recirculation device can be prevented from operating to impair combustibility.

According to the present disclosure when a vehicle including an internal combustion engine having a variable valve actuation device to control an intake valve to be lifted in a controlled amount and/or worked by a controlled working angle, has the amount and/or the angle fixed, the internal combustion engine can be operated to avoid excessively increased/decreased SOC that would lead to impaired fuel efficiency, incapability of travelling and the like preventing the vehicle from continuing to travel.

DESCRIPTION OF EMBODIMENTS

Hereinafter reference will be made to the drawings to describe the present disclosure in embodiments. In the figures, identical or corresponding components are identically denoted and will not be described repeatedly in principle.

First Embodiment

Figure 1:
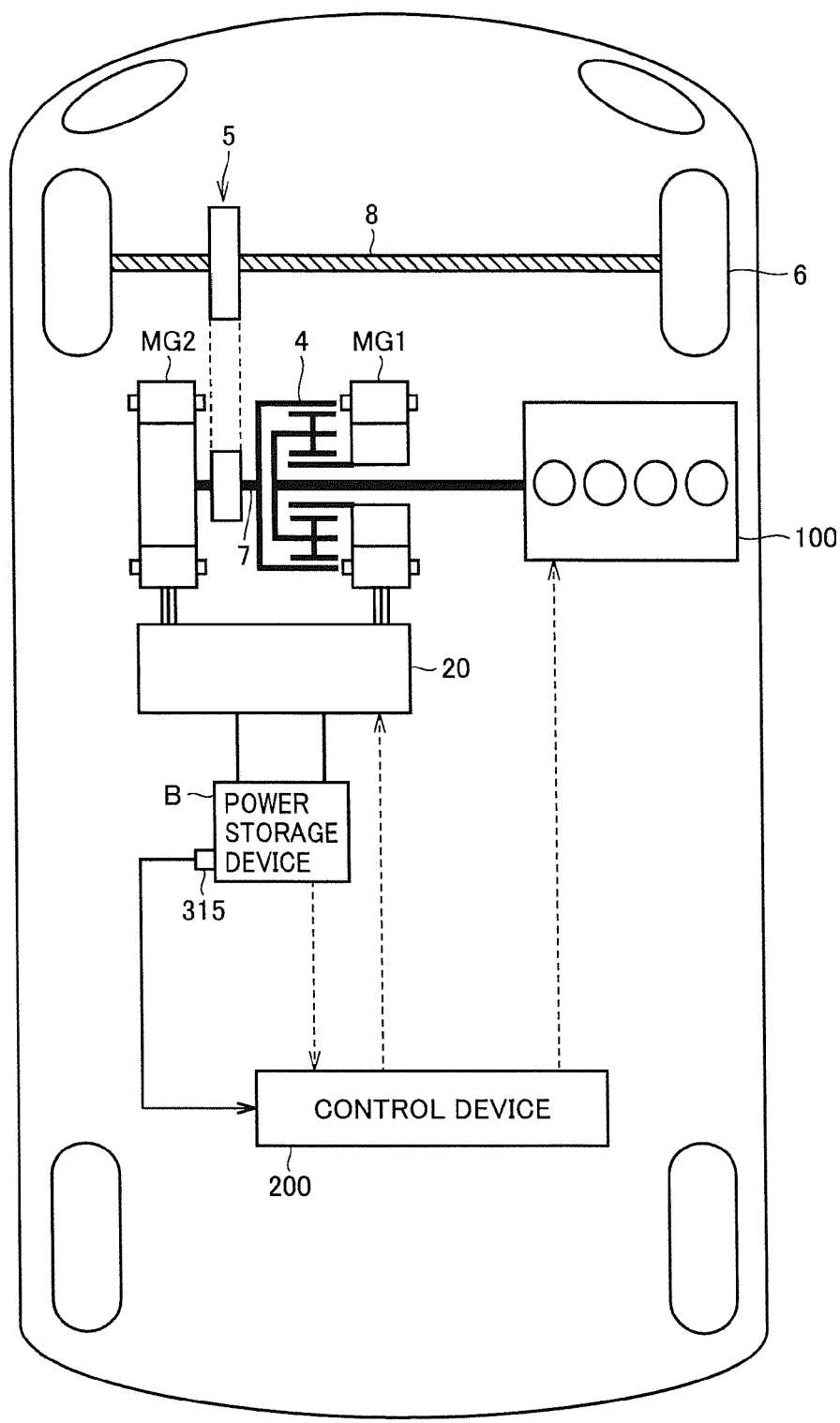
FIG. 1 is a block diagram generally showing a configuration of a hybrid vehicle according to a first embodiment of the present disclosure.

FIG. 1 is a block diagram generally showing a configuration of a hybrid vehicle according to an embodiment of the present disclosure.

With reference to FIG. 1, a hybrid vehicle 1 includes an engine 100, motor generators MG1 and MG2, a power split device 4, a speed reducer 5, a driving wheel 6, a power storage device B, a power control unit (PCU) 20, and a control device 200.

Engine 100 is for example an internal combustion engine which combusts a hydrocarbon based fuel, such as gasoline or light oil, to generate motive power.

Power split device 4 is configured to be capable of receiving the motive power that engine 100 generates, and dividing it to a path via an output shaft 7 to a drive shaft 8 and a path to motor generator MG1. Power split device 4 can be a planetary gear mechanism having three rotation shafts, i.e., a sun gear, a planetary gear and a ring gear. For example, motor generator MG1 can have a rotor hollowed to have a center allowing engine 100 to have a crankshaft passing therethrough to allow power split device 4 to have engine 100 and motor generators MG1 and MG2 mechanically connected thereto.

Specifically, motor generator MG1 has the rotor connected to the sun gear, engine 100 has an output shaft connected to the planetary gear, and output shaft 7 is connected to the ring gear. Output shaft 7, also connected to the rotation shaft of motor generator MG2, is mechanically coupled via speed reducer 5 to drive shaft 8 for rotating and thus driving wheel 6. Note that a speed reducer may further be incorporated between the rotation shaft of motor generator MG2 and output shaft 7.

Motor generator MG1, MG2 is an alternating current (AC) rotating electric machine, and is a three-phase AC synchronous, electrically motored power generator, for example. Motor generator MG1 operates as an electric power generator driven by engine 100 and also operates as an electric motor for starting engine 100, i.e., it is configured to function as an electric motor and an electric power generator. Motor generator MG1 can output torque to accelerate/decelerate the output shaft of engine 100, and engine 100 in operation can also be controlled in speed by adjusting the torque of motor generator MG1.

Similarly, motor generator MG2 generates vehicular driving force transmitted to driving wheel 6 via speed reducer 5 and drive shaft 8. Furthermore, motor generator MG2 is configured to have a function of an electric motor and that of an electric power generator to generate an output torque opposite in direction to a direction in which driving wheel 6 rotates to regenerate electric power.

Power storage device B is a chargeably and dischargeably configured electric power storage element. Power storage device B for example includes a rechargeable battery such as a lithium ion battery, a nickel metal hydride battery or a lead acid battery, or a cell of a power storage element such as an electric double layer capacitor. Power storage device B is provided with a sensor 315 for sensing power storage device B's temperature, current, and voltage. Sensor 315 senses the temperature, current, and voltage and outputs a value thereof to control device 200. Control device 200 receives the value from sensor 315 and uses the value to calculate a state of charge (SOC) of power storage device B. The SOC is typically indicated by a currently available capacity of power storage device B relative to a full charge capacity of power storage device B in percentages. The SOC can be calculated in any known methodology.

Power storage device B is connected to PCU 20 provided for driving motor generators MG1 and MG2. PCU 20 receives direct current (DC) electric power from power storage device B and converts the received DC electric power into AC electric power to drive motor generators MG1 and MG2. PCU 20 also receives AC electric power generated by motor generators MG1 and MG2 and converts the received AC electric power into DC electric power to charge power storage device B therewith. Power storage device B can thus store electric power for driving motor generators MG1 and MG2. Power storage device B outputs 200 V for example.

Note that power storage device B is charged/discharged as controlled in accordance with a limit value, which can be set as an upper limit value Wout for electric power discharged and an upper limit value Win for electric power charged. Upper limit value Wout for electric power discharged indicates an upper limit value set for electric power discharged, and it is set to be equal to or larger than zero. Wout=0 means that discharging power storage device B is prohibited. Similarly, upper limit value Win for electric power charged indicates an upper limit value set for electric power charged, and it is set to be equal to or smaller than zero. Win=0 means that charging power storage device B is prohibited.

For example, upper limit value Wout for electric power discharged and upper limit value Win for electric power charged are set depending on power storage device B's SOC and/or temperature Tb. Specifically, upper limit value Wout for electric power discharged and upper limit value Win for electric power charged can be set to limit charging when the power storage device is in a high SOC range and upper limit value Wout for electric power discharged and upper limit value Win for electric power charged can be set to limit discharging when the power storage device is in a low SOC range. Alternatively, for temperature Tb, upper limit value Wout for electric power discharged and upper limit value Win for electric power charged can be set to control charging/discharging for a low temperature range increasing internal resistance and a high temperature range for which no more heat generation is desired.

Control device 200 controls the outputs of engine 100 and motor generators MG1 and MG2, depending on how the vehicle travels. In particular, control device 200 controls hybrid vehicle 1 to travel to allow the vehicle to travel with engine 100 stopped and motor generator MG2 serving as a source of motive power, i.e., to travel as an EV, and to travel with engine 100 in operation, i.e., to travel as an HV, in combination.

Hereinafter will be described how an engine having a variable valve actuation device is configured.

Figure 2:
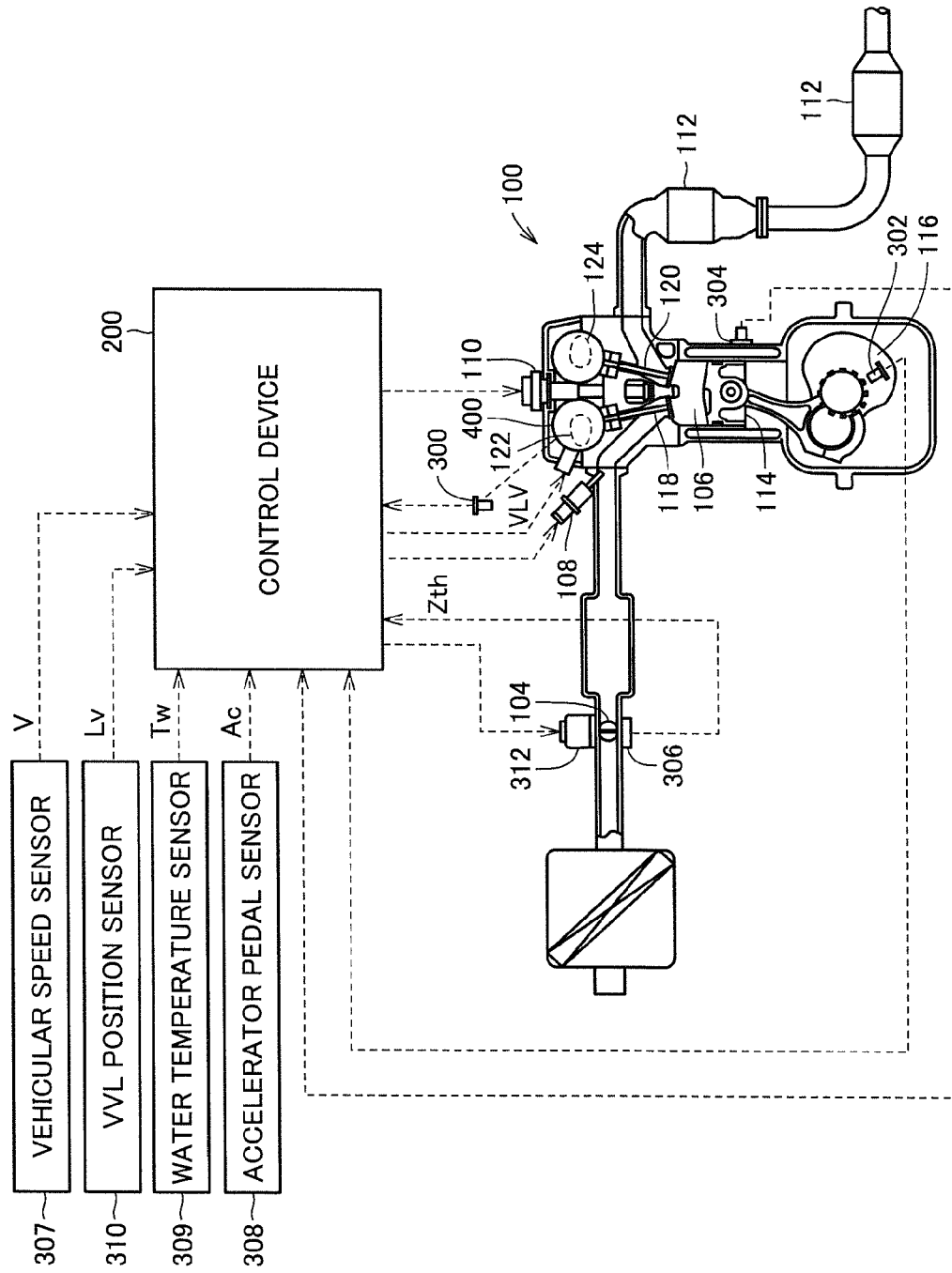
FIG. 2 shows a configuration of an engine shown in FIG. 1.

FIG. 2 shows a configuration of engine 100 shown in FIG. 1.

With reference to FIG. 2, how much amount of air is taken into engine 100 is adjusted by a throttle valve 104. Throttle valve 104 is an electronically controlled throttle valve driven by a throttle motor 312.

An injector 108 injects fuel towards an air intake port. At the intake port, the fuel is mixed with air. The air-fuel mixture is introduced into a cylinder 106 when intake valve 118 opens.

Note that injector 108 may be provided as a direct injection injector to inject fuel directly into cylinder 106. Alternatively, injector 108 may be provided for both port injection and direct injection.

Cylinder 106 receives the air-fuel mixture, which is ignited by an ignition plug 110 and thus combusted. The combusted air-fuel mixture, or exhaust gas, is purified by a three-way catalyst 112 and subsequently discharged outside the vehicle. As the air-fuel mixture is combusted, a piston 114 is pushed down and a crankshaft 116 thus rotates.

Cylinder 106 has a head or top portion provided with intake valve 118 and an exhaust valve 120. When and in what amount cylinder 106 receives air is controlled by intake valve 118. When and in what amount cylinder 106 discharges exhaust gas is controlled by exhaust valve 120. Intake valve 118 is driven by a cam 122. Exhaust valve 120 is driven by a cam 124.

Intake valve 118 has an actuation characteristic, as controlled by a variable valve lift (VVL) device 400, as will more specifically be described hereinafter. Hereinafter, intake valve 118 has the actuation characteristic controlled as an amount of lifting the intake valve and a working angle on the intake valve by way of example. Note that exhaust valve 120 may also be lifted in an amount and/or worked by a working angle, as controlled. Furthermore, a variable valve timing (VVT) device may be combined with VVL device 400 to control timing when the valve should be opened/closed.

Control device 200 controls a throttle angle Zth, timing when to provide ignition, timing when to inject fuel, the amount of fuel to be injected, and the intake valve's operating condition (timing when to open/close the valve, the amount of lifting it, the working angle, and the like) to allow engine 100 to achieve an operating state as desired. In the present embodiment will be described an example of controlling the engine's output on a power basis. Accordingly, control device 200, in controlling hybrid vehicle 1 for travelling, sets an output that engine 100 is required to provide as a required engine power Pe. Furthermore, control device 200 controls the above parameter group to allow engine 100 to operate at an operating point (a combination of engine speed and engine torque) to generate an output in accordance with required engine power Pe.

Control device 200 receives signals from a cam angle sensor 300, a crank angle sensor 302, a knock sensor 304, a throttle angle sensor 306, a vehicular speed sensor 307, an accelerator pedal sensor 308, a water temperature sensor 309, and a VVL position sensor 310.

Cam angle sensor 300 outputs a signal indicating a cam's position. Crank angle sensor 302 outputs a signal indicating the rotational speed of crankshaft 116 (or engine speed) and the angle of rotation of crankshaft 116. Knock sensor 304 outputs a signal indicating how engine 100 vibrates in intensity. Throttle angle sensor 306 outputs a signal indicating throttle angle Zth.

Water temperature sensor 309 senses temperature Tw of a water coolant of engine 100. The water coolant's temperature Tw as sensed is input to control device 200. Accelerator pedal sensor 308 senses by how much amount Ac the driver operates the accelerator pedal (not shown). Vehicular speed sensor 307 senses vehicular speed V of hybrid vehicle 1 from the rotational speed of drive shaft 8 and the like. Amount Ac by which the accelerator pedal is operated, as sensed by accelerator pedal sensor 308, and vehicular speed V as sensed by vehicular speed sensor 307, are input to control device 200.

Furthermore, VVL position sensor 310 is configured to sense data Lv indicating the current actuation characteristic of intake valve 118 as controlled by VVL device 400. Data Lv sensed by VVL position sensor 310 is input to control device 200. That is, control device 200 can detect from data Lv received from VVL position sensor 310 the current value of the amount of lifting the intake valve and the current value of the working angle on the intake valve.

Figure 3:
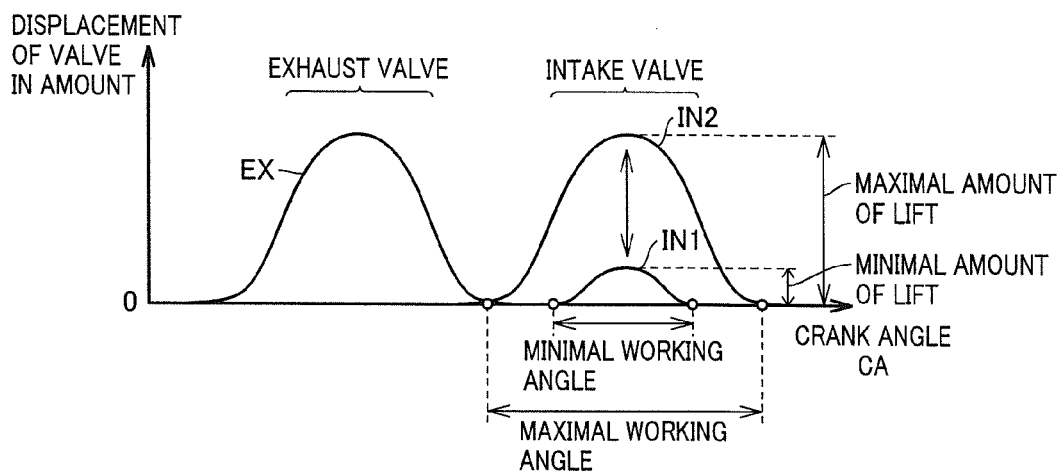
FIG. 3 represents a relationship, as implemented in a VVL device, between a valve's displacement in amount and crank angle.

FIG. 3 represents a relationship, as implemented in VVL device 400, between a valve's displacement in amount and crank angle. With reference to FIG. 3, for the exhaust stroke, exhaust valve 120 opens and closes, and for the intake stroke, intake valve 118 opens and closes. Exhaust valve 120 displaces in an amount represented by a waveform EX, and intake valve 118 displaces in amounts represented by waveforms IN1 and IN2.

The valve's displacement in amount indicates an amount by which intake valve 118 is displaced from its closed position. The amount of lift indicates an amount by which intake valve 118 is displaced when the valve peaks in how much in degree it is opened. The working angle is a crank angle assumed after intake valve 118 is opened before it is closed.

Intake valve 118 has an actuation characteristic varied by VVL device 400 between waveforms IN1 and IN2. Waveform IN1 corresponds to a minimal amount of lift and a minimal working angle. Waveform IN2 corresponds to a maximal amount of lift and a maximal working angle. In VVL device 400, a larger amount of lift is accompanied by a larger working angle. In other words, the present embodiment presents VVL device 400 by way of example to allow intake valve 118 to be lifted in an amount and worked by a working angle as an actuation characteristic of intake valve 118, as modified in VVL device 400.

Figure 4:
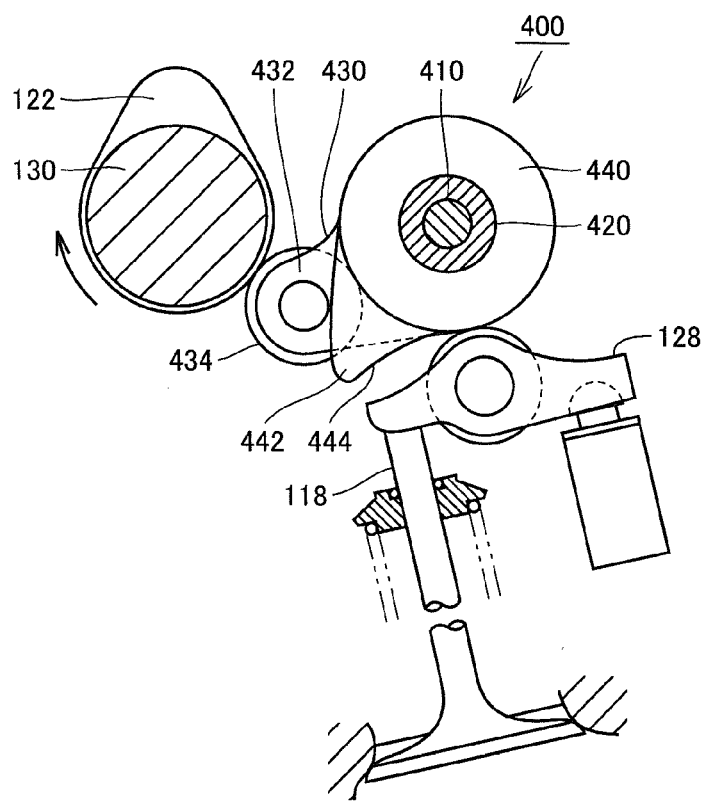
FIG. 4 is a front view of the VVL device.

FIG. 4 is a front view of VVL device 400 serving as an exemplary device that controls an amount of lifting intake valve 118 and a working angle on intake valve 118.

With reference to FIG. 4, VVL device 400 includes a driving shaft 410 extending in one direction, a support pipe 420 that covers driving shaft 410 circumferentially, and an input arm 430 and a rocking cam 440 disposed in alignment on an outer circumferential surface of support pipe 420 in a direction along the axis of driving shaft 410. Driving shaft 410 has a tip with an actuator (not shown) connected thereto to cause driving shaft 410 to provide rectilinear motion.

VVL device 400 is provided with a single input arm 430 associated with a single cam 122 provided for each cylinder. Input arm 430 has opposite sides provided with two rocking cams 440 associated with a pair of intake valves 118, respectively, provided for each cylinder.

Support pipe 420 is formed in a hollowed cylinder and disposed in parallel to a cam shaft 130. Support pipe 420 is secured to a cylinder head and thus prevented from axially moving or rotating.

Support pipe 420 internally receives driving shaft 410 to allow driving shaft 410 to slide axially. Support pipe 420 has an outer circumferential surface provided thereon with input arm 430 and two rocking cams 440 to be rockable about an axial core of driving shaft 410 and also prevented from moving in a direction along the axis of driving shaft 410.

Input arm 430 has an arm portion 432 projecting in a direction away from the outer circumferential surface of support pipe 420, and a roller portion 434 rotatably connected to a tip of arm portion 432. Input arm 430 is provided to allow roller portion 434 to be disposed at a position allowing roller portion 434 to abut against cam 122.

Rocking cam 440 has a nose portion 442 in a generally triangular form projecting in a direction away from the outer circumferential surface of support pipe 420. Nose portion 442 has one side having a recessed, curved cam surface 444. Intake valve 118 is provided with a valve spring, which is biased to apply force to in turn press against cam surface 444 a roller rotatably attached to a rocker arm 128.

Input arm 430 and rocking cam 440 rock together about the axial core of driving shaft 410. Accordingly, as cam shaft 130 rotates, input arm 430 that abuts against cam 122 rocks, and as input arm 430 thus moves, rocking cam 440 also rocks. This motion of rocking cam 440 is transmitted via rocker arm 128 to intake valve 118 to thus open/close intake valve 118.

VVL device 400 further includes a device around the axial core of support pipe 420 to vary a relative phase difference between input arm 430 and rocking cam 440. The device that varies the relative phase difference allows intake valve 118 to be lifted in an amount and worked by a working angle, as modified as appropriate.

More specifically, input arm 430 and rocking cam 440 with an increased relative phase difference allow rocker arm 128 to have a rocking angle increased relative to that of input arm 430 and rocking cam 440 and intake valve 118 to be lifted in an increased amount and worked by an increased working angle.

In contrast, input arm 430 and rocking cam 440 with a reduced relative phase difference allow rocker arm 128 to have a rocking angle reduced relative to that of input arm 430 and rocking cam 440 and intake valve 118 to be lifted in a reduced amount and worked by a reduced working angle.

Figure 5:
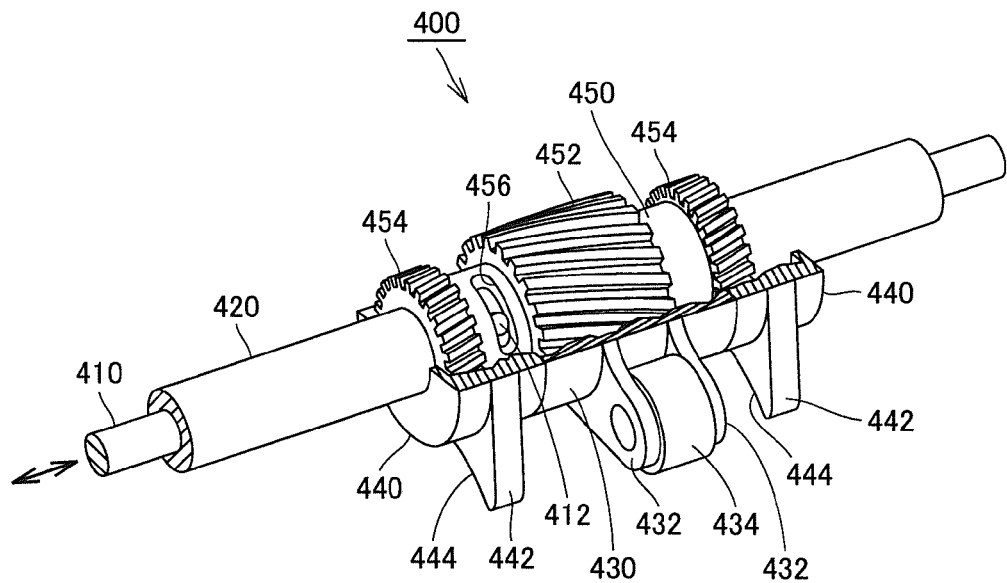
FIG. 5 is a partial perspective view of the VVL device shown in FIG. 4.

FIG. 5 is a partial perspective view of VVL device 400. FIG. 5 shows VVL device 400 partially exploded to help to clearly understand its internal structure.

With reference to FIG. 5, input arm 430 and two rocking cams 440, and an outer circumferential surface of support pipe 420 define a space therebetween, and in that space, a slider gear 450 is accommodated that is supported to be rotatable relative to support pipe 420 and also axially slidable. Slider gear 450 is provided slidably on support pipe 420 axially.

Slider gear 450 as seen axially has a center provided with a helically right handed splined helical gear 452. Slider gear 450 as seen axially also has opposite sides provided with helically left handed splined helical gears 454s, respectively, with helical gear 452 posed therebetween.

An internal circumferential surface of input arm 430 and two rocking cams 440 that defines the space that has slider gear 450 accommodated therein, is helically splined to correspond to helical gears 452 and 454. More specifically, input arm 430 is helically right handed splined to mesh with helical gear 452. Furthermore, rocking cam 440 is helically left handed splined to mesh with helical gear 454.

Slider gear 450 is provided with an elongate hole 456 located between one helical gear 454 and helical gear 452 and extending circumferentially. Furthermore, although not shown, support pipe 420 is provided with an elongate hole extending axially and overlapping a portion of elongate hole 456. Driving shaft 410, inserted in support pipe 420, is integrally provided with a locking pin 412 to project through those portions of elongate hole 456 and the unshown elongate hole which overlap each other.

Driving shaft 410 is coupled with an actuator (not shown), and when the actuator is operated, driving shaft 410 moves in its axial direction, and accordingly, slider gear 450 is pushed by locking pin 412 and helical gears 452 and 454 move in a direction along the axis of driving shaft 410 concurrently. While helical gears 452 and 454 are thus moved, input arm 430 and rocking cam 440 splined and thus engaged therewith do not move in the axial direction. Accordingly, input arm 430 and rocking cam 440, helically splined and thus meshed, pivot about the axial core of driving shaft 410.

Note that input arm 430 and rocking cam 440 are helically splined in opposite directions, respectively. Accordingly, input arm 430 and rocking cam 440 pivot in opposite directions, respectively. This allows input arm 430 and rocking cam 440 to have a relative phase difference varied to allow intake valve 118 to be lifted in a varying amount and worked by a varying working angle, as has been previously described.

For example, VVL position sensor 310 shown in FIG. 2 is configured to have a mechanism capable of sensing a mechanical phase difference between input arm 430 and rocking cam 440. Alternatively, VVL position sensor 310 can also be configured to have a mechanism capable of sensing an axial position of driving shaft 410 moved by an actuator (not shown). Note that VVL position sensor 310 may have any configuration that allows its sensed value to be used to directly or indirectly obtain the actuation characteristic of intake valve 118, i.e., the amount of lifting intake valve 118 and the working angle on intake valve 118.

Control device 200 adjusts by how much amount the actuator that causes driving shaft 410 to move in rectilinear motion should be operated to control the amount of lifting intake valve 118 and the working angle on intake valve 118. The actuator can for example be an electric motor. In that case, the actuator or electric motor typically receives electric power from a battery (an auxiliary battery) other than power storage device B. Alternatively, the actuator can also be configured to be operated by the hydraulic pressure generated from an oil pump driven by engine 100.

Note that the VVL device is not limited to the form exemplified in FIGS. 4 and 5. For example, the VVL device may be a VVL device which electrically drives the valve, a VVL device which hydraulically drives the valve, or the like. In other words, in the present embodiment, intake valve 118 may have the actuation characteristic (or be lifted in an amount and worked by a working angle) varied by any scheme, and any known scheme may be applied as appropriate.

The intake valve's actuation characteristic and the engine's operation have a relationship, as will be described hereinafter.

Figure 6:
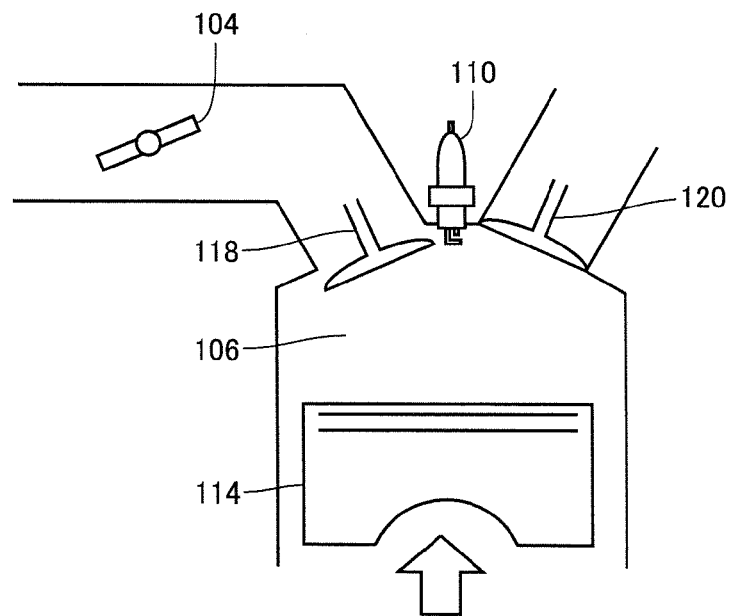
FIG. 6 provides a representation for illustrating an operation provided when an intake valve is lifted in a large amount and worked by a large working angle.
Figure 7:
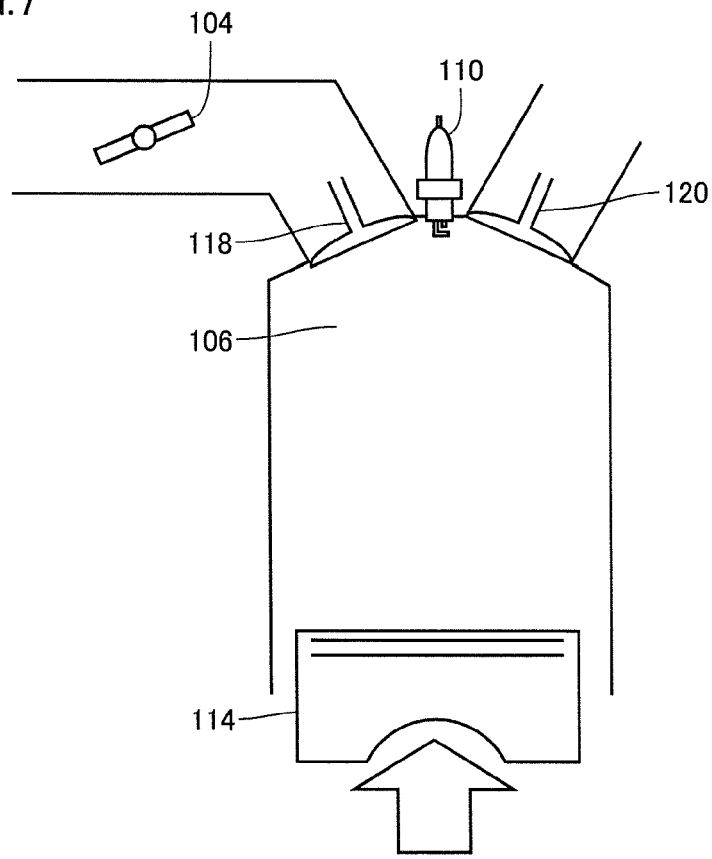
FIG. 7 provides a representation for illustrating an operation provided when the intake valve is lifted in a small amount and worked by a small working angle.

FIG. 6 provides a representation for illustrating an operation provided when intake valve 118 is lifted in a large amount and worked by a large working angle. FIG. 7 illustrates an operation provided when intake valve 118 is lifted in a small amount and worked by a small working angle.

With reference to FIG. 6, when intake valve 118 is lifted in a large amount and worked by a large working angle, intake valve 118 is timed to close late, and accordingly, engine 100 is operated in the Atkinson cycle. This allows enhanced fuel efficiency. Furthermore, the intake stroke is performed to allow cylinder 106 to take in air, which is partially returned outside cylinder 106, and accordingly, the compression stroke is performed with the air compressed by a reduced force, i.e., with a reduced compressive reaction. Accordingly, in starting the engine, intake valve 118 can be lifted in a large amount and worked by a large working angle to allow the engine to be started with reduced vibration. On the other hand, lifting intake valve 118 in a large amount and working it by a large working angle result in a reduced compression ratio and hence impaired combustibility.

With reference to FIG. 7, when intake valve 118 is lifted in a small amount and worked by a small working angle, intake valve 118 is timed to close early, and accordingly, an increased compression ratio is provided. This can improve engine 100 in combustibility and hence enhance ignitability for low temperature and also improve engine torque response. In contrast, for a high engine speed range, intake air's inertia can no longer be exploited, which results in a reduced intake air volume and hence a relatively reduced outputtable engine torque. On the contrary, for a low engine speed range, it is difficult to reduce intake air volume and hence output a small torque.

Figure 8:
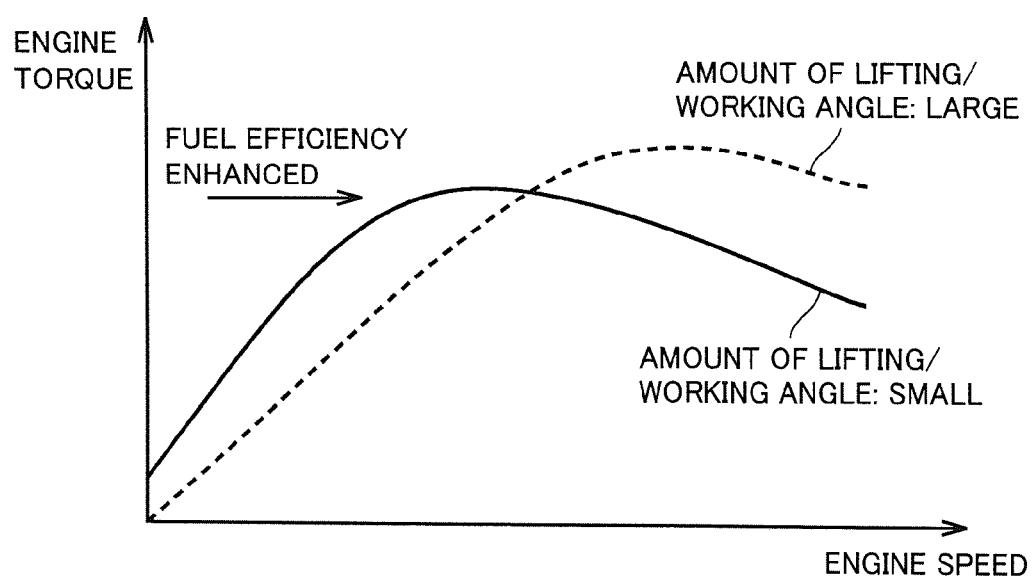
FIG. 8 is a graph representing a relationship between engine speed and engine torque when the intake valve's actuation characteristic (or an amount of lifting the intake valve and a working angle on the intake valve) is varied.

FIG. 8 represents a relationship between engine speed and engine torque when intake valve 118's actuation characteristic (or an amount of lifting the intake valve and a working angle on the intake valve) is varied. In FIG. 8, a solid line represents a characteristic provided when the intake valve is lifted in a small amount and worked by a small working angle (e.g., set to be a minimum), and a dotted line represents a characteristic provided when the intake valve is lifted in a large amount and worked by a large working angle (e.g., set to be a maximum).

With reference to FIG. 8, for a low engine speed range, intake valve 118 being lifted in the small amount and worked by the small working angle allows larger engine torque than intake valve 118 being lifted in the large amount and worked by the large working angle, and the former also allows higher torque response than the latter. This is because, as has been described with reference to FIG. 6 and FIG. 7, when intake valve 118 is lifted in a large amount and worked by a large working angle, the air taken into the cylinder is partially returned outside the cylinder, whereas when intake valve 118 is lifted in a small amount and worked by a small working angle, intake valve 118 is closed early, and accordingly, an increased compression ratio is provided.

In contrast, for a high engine speed range, intake valve 118 being lifted in the large amount and worked by the large working angle allows larger engine torque than intake valve 118 being lifted in the small amount and worked by the small working angle. This is because, as has been previously discussed, the high engine speed range allows air's inertial force to introduce a large amount of air into the cylinder while intake valve 118 is timed to close late.

While FIGS. 6-8 show a characteristic provided when VVL device 400 allows intake valve 118 to be lifted in a varying (or increasing/decreasing) amount and worked by a varying (or increasing/decreasing) working angle, either lifting intake valve 118 in a varying (or increasing/decreasing) amount or working intake valve 118 by a varying (or increasing/decreasing) working angle also allows a qualitatively equivalent feature to appear.

Accordingly, with the above characteristic considered, intake valve 118 can have an actuation characteristic controlled by VVL device 400, depending on an operation range defined by engine speed and engine torque in combination, to control engine 100 appropriately.

On the other hand, when VVL device 400 has failed or been stuck at extremely low temperature or the like and accordingly, intake valve 118 has the actuation characteristic (or is lifted in an amount and worked by a working angle in the present embodiment) fixed for some reason, engine 100 may provide an output limited in accordance with the relationship between the actuation characteristic of intake valve 118 and the characteristic of the output of the engine, as has been described with reference to FIGS. 6-8.

In particular, when intake valve 118 has the actuation characteristic fixed such that it is lifted in a small amount and worked by a small working angle, the engine can only provide an output along the solid line shown in FIG. 8. Accordingly, for the low engine speed range, engine torque cannot be reduced, and controllable minimum torque increases. Furthermore, for the high engine speed range, maximum torque that can be output decreases. In other words, engine 100 may, in reality, only be able to accommodate the vehicle with a limited output range (or a limited power range in the present embodiment).

As will more specifically be described later, how hybrid vehicle 1 travels is controlled in such a manner that an output that the vehicle as a whole requires is allocated among engine 100 and motor generators MG1 and MG2. In the present embodiment, power that hybrid vehicle 1 as a whole is required to output (hereinafter also referred to as "total required power") is allocated among engine 100 and motor generators MG1 and MG2 for the sake of illustration. Accordingly, engine 100 provides an output (or outputs power) as controlled in accordance with a power allocation applied in controlling how the vehicle travels.

Accordingly, if intake valve 118 has the actuation characteristic fixed, engine 100 may output power excessively more or insufficiently less than required engine power Pe following a power allocation applied in controlling how the vehicle travels. In particular, if intake valve 118 has the actuation characteristic fixed in a state indicated in FIG. 8 by the dotted line, then, for a low output range (i.e., a low engine speed and small torque range), the engine may output power excessively more than required engine power Pe, or for a high output range (i.e., a high engine speed and large torque range), the engine may output power insufficiently less than required engine power Pe.

When actual engine power is insufficiently less or excessively more than required engine power Pe, the shortage or excess will be compensated for by an output of motor generators MG1 and MG2. In other words, motor generators MG1 and MG2 will output torque, with power storage device B charged/discharged, to ensure that hybrid vehicle 1 as a whole outputs power that it is required to output.

If this frequently occurs or continues, power storage device B may have an excessively increased or decreased SOC. Decreased SOC results in hybrid vehicle 1 having impaired acceleration performance. Significantly decreased SOC may result in the vehicle being no longer capable of travelling. When power storage device B has an excessively increased SOC, upper limit value Win for electric power charged is set to be equal to zero (Win=0), and motor generator MG1 cannot generate torque to decelerate engine 100. As a result, engine 100 cannot be stopped, and the engine is thus forced to idle, which may result in impaired fuel efficiency.

Accordingly, the present embodiment provides a hybrid vehicle including an engine having intake valve 118 with an actuation characteristic (or lifted in an amount and worked by a working angle) such that when the intake valve has the actuation characteristic (i.e., the amount and the angle) fixed, the vehicle is controlled for travelling such that the engine is operated to avoid excessively increased/decreased SOC that would lead to impaired fuel efficiency, incapability of travelling, and the like.

Figure 9:
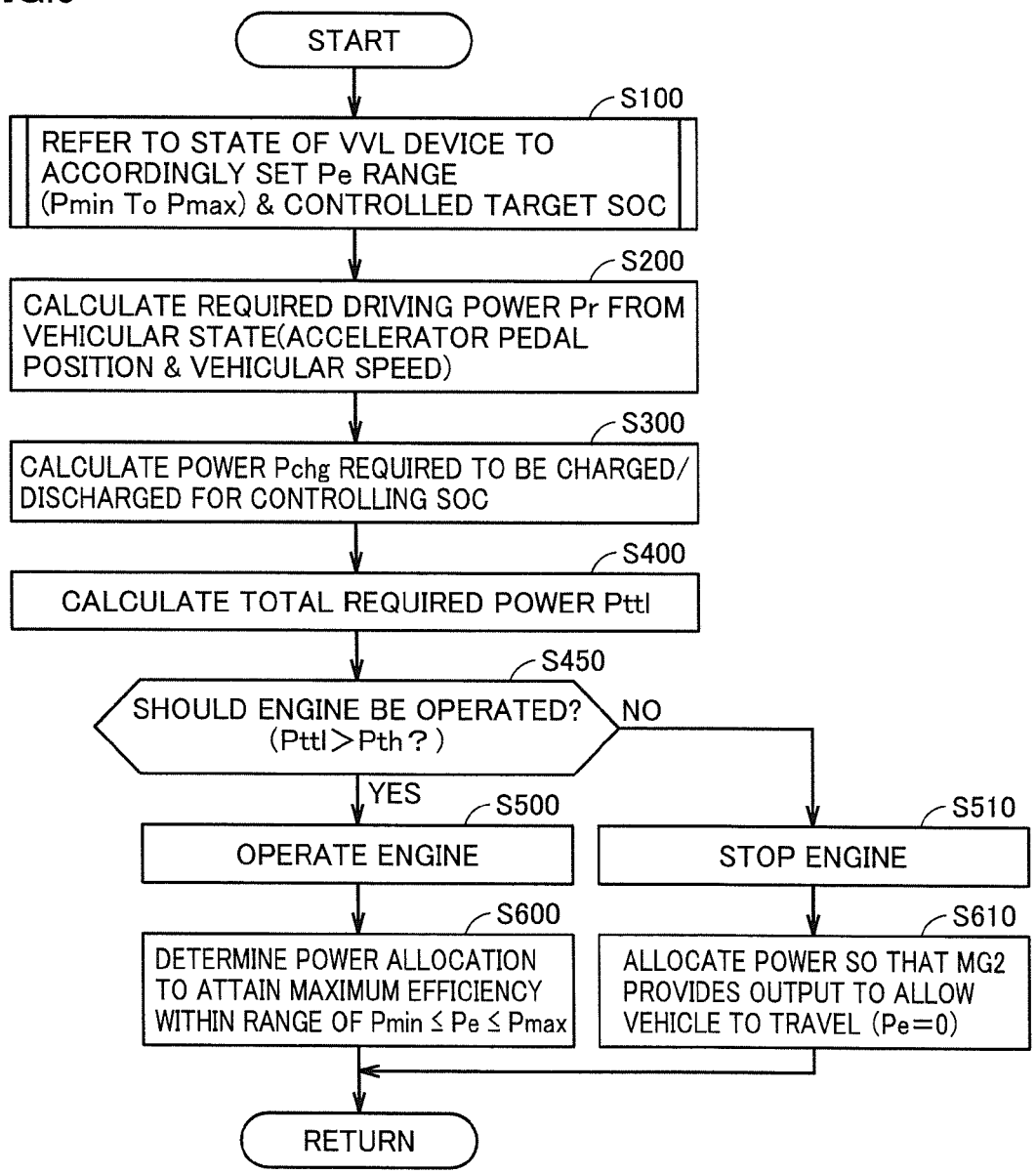
FIG. 9 is a flowchart of a process of how the hybrid vehicle is controlled for travelling according to an embodiment of the present disclosure.

FIG. 9 is a flowchart of a process of how the hybrid vehicle is controlled for travelling according to an embodiment of the present disclosure. The FIG. 9 process is implemented for example by control device 200 periodically executing a previously stored program.

With reference to FIG. 9, control device 200 in Step S100 refers to a state of VVL device 400 to accordingly set a range allowing required engine power Pe to be set therewithin (hereafter also simply referred to as a "Pe range"), and a controlled target SOC for power storage device B. The Pe range is defined by a maximum value Pmax and a minimum value Pmin of required engine power Pe. Step S100 provides a setting, which will more specifically be described hereinafter. More specifically, in the present embodiment, required engine power Pe corresponds to an "output that the internal combustion engine is required to provide," and the Pe range corresponds to a "range applied to set therewithin the output that the internal combustion engine is required to provide."

Control device 200 proceeds to Step S200 to refer to a vehicular status of hybrid vehicle 1 to calculate required driving power Pr. Required driving power Pr is calculated according to the product of a required torque Tr* reflecting by how much amount Ac the driver operates the accelerator pedal (see FIG. 2) and the rotational speed of drive shaft 8.

Required torque Tr* is set to higher values for larger amounts Ac by which the accelerator pedal is operated. Furthermore, for a given amount Ac by which the accelerator pedal is operated, in combination with vehicular speed, required torque Tr* may be set to have smaller values for vehicular speed V (see FIG. 2) having larger values. Alternatively, required torque Tr* can also be set in accordance with a previously set map or operation expression, depending on a road surface condition (a road surface gradient, a road surface friction coefficient, and the like).

Furthermore, control device 200 proceeds to Step S300 to calculate power Pchg required to be charged/discharged for controlling power storage device B in SOC. When power storage device B has an SOC decreased below the controlled target set in Step S100, Pchg>0 is set to charge power storage device B. In contrast, when power storage device B has an SOC increased above the controlled target set in Step S100, Pchg<0 is set to discharge power storage device B. In other words, power Pchg required to be charged/discharged is set to allow power storage device B to have an SOC close to the controlled target.

Note that the controlled target SOC may be a controlled center SOC value or may be a controlled target SOC range having a range. Shifting the controlled target SOC (or the controlled center value or the controlled target range) toward higher SOC allows an SOC to be controlled to be higher than normal (or default).

Control device 200 proceeds to Step S400 to use required driving power Pr that is set in Step S200 and power Pchg required to be charged/discharged that is set in Step S300 to calculate total required power Pttl that hybrid vehicle 1 as a whole is required to output (Pttl=Pr+Pchg).

Furthermore, control device 200 proceeds to Step S450 to determine, based on total required power Pttl set in Step S400, whether engine 100 should be operated. For example, total required power Pttl is compared with a threshold power value Pth to determine whether the engine should be operated. Note that threshold power value Pth may be a fixed value or may be a value varying with the vehicle's state.

When control device 200 determines in Step S450 that the engine should be operated, e.g., when Pttl>Pth (YES in S450), control device 200 proceeds to Step S500 to operate engine 100. Accordingly, when engine 100 is stopped, an instruction is issued to start the engine. If the engine is already in operation, the engine is held in operation.

When the engine is in operation, control device 200 proceeds to Step S600 to determine a power allocation across hybrid vehicle 1 to allow the vehicle as a whole to present high energy efficiency. When the engine is in operation, the power allocation is done such that required engine power Pe is determined within the Pe range determined in Step S100 (i.e., Pmin to Pmax). In other words, Pe is limited to be equal to Pmax (Pe=Pmax) even if in view of energy efficiency an operating point should be set that provides required engine power Pe larger than Pmax. Similarly, Pe is limited to be equal to Pmin (Pe=Pmin) even if in view of energy efficiency an operating point should be set that provides required engine power Pe smaller than Pmin.

A power allocation is then determined to allow required engine power Pe and an output of motor generators MG1 and MG2 to ensure total required power Pttl. Note that, in determining the power allocation, a torque that motor generators MG1 and MG2 output is also limited so that motor generators MG1 and MG2 output powers (i.e., product of torque and rotational speed), respectively, with their sum falling within the range from upper limit value Win for electric power charged to upper limit value Wout for electric power discharged, to protect power storage device B. Note, however, that, to ensure total required power Pttl, charging/discharging within the range of Win to Wout is permitted, and charging/discharging within that range may be continued, resulting in an SOC increasing/decreasing away from a controlled target.

Engine 100 is controlled in accordance with required engine power Pe set in Step S600. More specifically, the engine can operate significantly efficiently at an operating point corresponding to a combination of engine speed and engine torque, and a set of such operating points is previously set as an engine operating line and therefrom a targeted operating point that attains an engine power corresponding to required engine power Pe as set is extracted to set a target value of engine speed and engine torque, for example. Then, throttle angle Zth, timing when to provide ignition, timing when to inject fuel, the amount of fuel to be injected, the intake valve's operating condition (timing when to open/close the valve, the amount of lifting it, the working angle, and the like) and the like are controlled to allow engine 100 to operate along the target value of engine speed and engine torque. Furthermore, to allow engine speed to approach the above target value, a torque that motor generator MG1 outputs may be also controlled.

In contrast, if control device 200 determines that it is unnecessary to operate the engine, e.g., when Pttl<Pth (NO in S450), control device 200 proceeds to Step S510 to stop engine 100. Accordingly, when engine 100 is stopped, the engine is held stopped. In contrast, when the engine is in operation, a process starts to stop engine 100. This for example stops fuel injection and allows motor generator MG1 to generate a deceleration torque to allow engine speed to pass through a resonant range in a reduced period of time to thus stop engine 100.

In doing so, motor generator MG1 generates electrical power as it outputs the deceleration torque. Accordingly, when charging power storage device B is limited or prohibited (i.e., when |Win| is smaller than a prescribed value), the engine stopping process cannot be performed. Accordingly, in such a state, it is necessary to compulsorily make a decision of YES in Step S450. More specifically, if in Step S450 the engine is in operation and |Win| is smaller than the prescribed value, then, regardless of total required power Pttl, it is determined that the engine should be operated (YES in S450). In that case, required engine power Pe as essential is 0, and accordingly, engine 100 will be idled.

When the engine is stopped (S510), control device 200 proceeds to Step S610 to determine a power allocation. In Step S610, the power allocation is done so that engine 100 is stopped and motor generator MG2 provides an output to allow the vehicle to travel. In that case, a torque control value is set for motor generator MG2 in accordance with total required power Pttl. In other words, required engine power Pe is set to be equal to 0. Hybrid vehicle 1 thus travels as controlled in accordance with a power allocation involving intermittently operating engine 100.

In the FIG. 9 Step S100, control device 200 sets the Pe range and the controlled target SOC depending on the state of VVL device 400, as will more specifically be described hereinafter.

Figure 10:
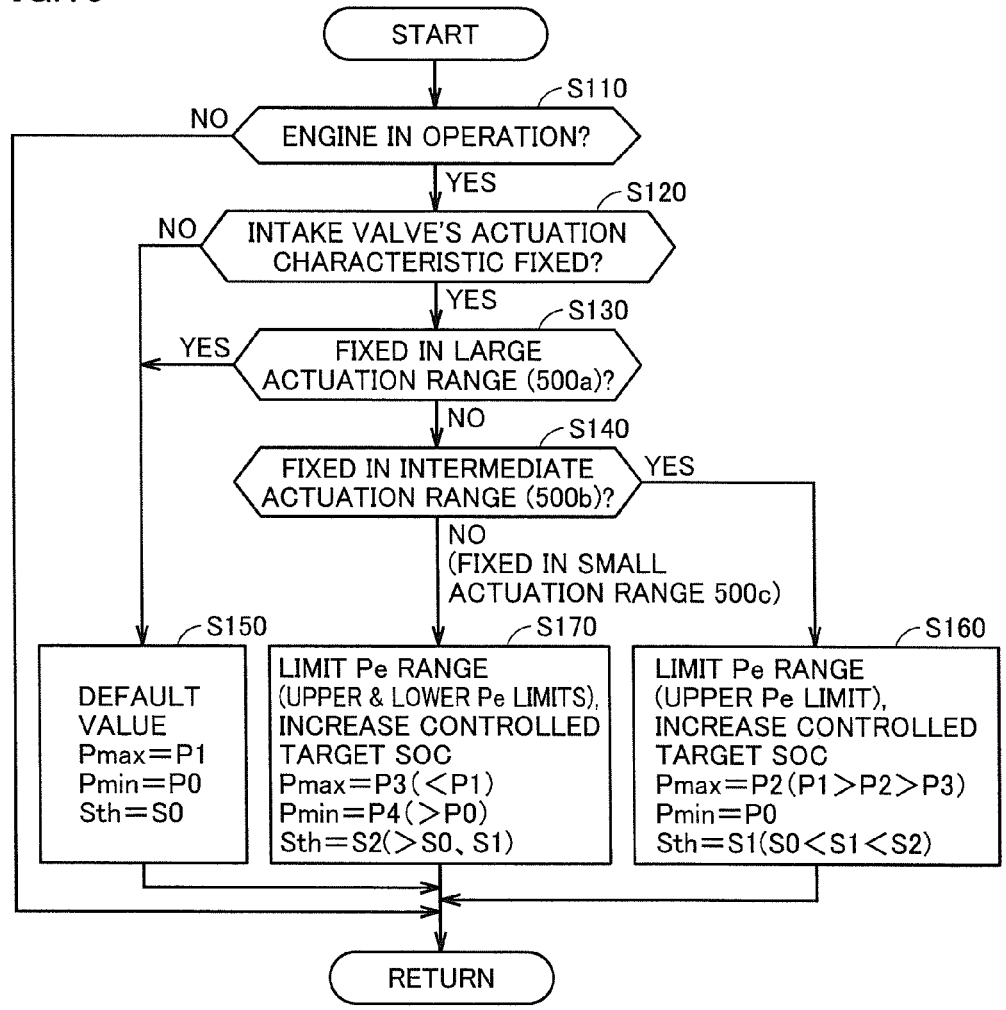
FIG. 10 is a flowchart of a process for setting a Pe range and a controlled target SOC depending on a state of a VVL device.

FIG. 10 is a flowchart for more specifically illustrating the FIG. 9 Step S100.

With reference to FIG. 10, the FIG. 9 Step S100 includes Steps S110 to S170, as follows:

Initially, control device 200 proceeds to Step S110 to determine whether the engine is in operation. When the engine is in operation (YES in S110), control device 200 proceeds to Steps S120 to S170 to refer to the state of VVL device 400 to set a Pe range and a controlled target SOC. In contrast, when the engine is stopped ((NO in S110), then, as has been described previously, required engine power Pe is fixed to be equal to zero, and accordingly, Steps S120 to S170 are not performed.

Control device 200 in Step S120 determines whether intake valve 118 having the actuation characteristic controlled by VVL device 400 has the actuation characteristic fixed for some reason. For example, a decision of YES is made in Step S120 when VVL position sensor 310 provides an output that is unchanged for more than a prescribed period of time in a state different from a control value issued to VVL device 400 to lift the intake valve in an amount and work the intake valve by a working angle. As described above, a decision of YES can also be made in Step S120 not only when VVL device 400 has failed but also when low temperature or the like results in a temporarily fixed actuation characteristic while VVL device 400 normally operates.

Note that, as can be seen from FIG. 8, when intake valve 118 has the actuation characteristic (or is worked by a working angle and lifted in an amount) fixed, how the actuation characteristic is fixed affects what output characteristic engine 100 has. Accordingly, when control device 200 in Step S120 makes a decision of YES, control device 200 proceeds to Steps S130 and S140 to stratify the fixed actuation characteristic of the intake valve.

Figure 11:
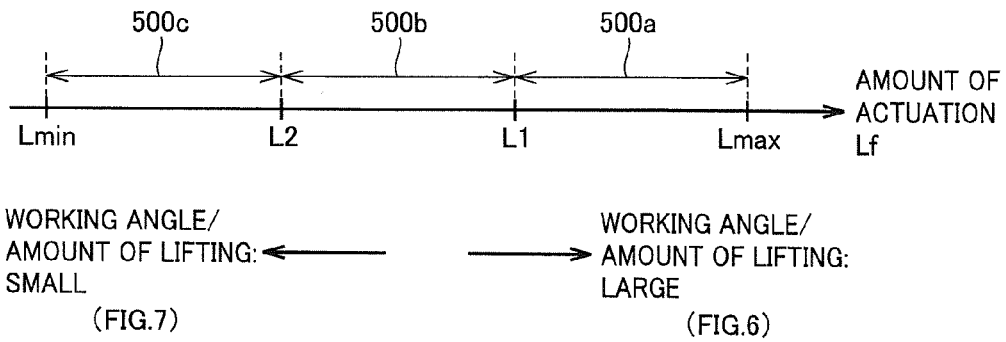
FIG. 11 is a representation for illustrating how the intake valve's fixed actuation characteristic is stratified.

FIG. 11 is a representation for illustrating how the intake valve's fixed actuation characteristic is stratified.

With reference to FIG. 11, when intake valve 118 has the actuation characteristic fixed, the intake valve is lifted in an amount and worked by a working angle, and the current value of such amount and angle will hereinafter be collectively represented as an amount of actuation Lf. When intake valve 118 has the actuation characteristic fixed, amount of actuation Lf will be fixed in a range of a minimum value Lmin, which corresponds to the intake valve being lifted in a minimum amount and worked by a minimum working angle, to a maximum value Lmax, which corresponds to the intake valve being lifted in a maximum amount and worked by a maximum working angle. Accordingly, if the FIG. 10 Step S120 indicates a decision of YES, then the current output of VVL position sensor 310 is referred to compare amount of actuation Lf that is fixed with prescribed values L1 and L2.

When intake valve 118 is in a fixed state, it has amount of actuation Lf, which is stratified into a large actuation range 500a (Lf>L1), an intermediate actuation range 500b, and a small actuation range 500c (Lf<L2). As has been described with reference to FIG. 8, for small actuation range 500c, the range of an output that engine 100 is required to provide (e.g., the Pe range) is limited in accordance with the characteristic indicated in FIG. 8 by the dotted line. In contrast, for large actuation range 500a, as indicated in FIG. 8 by the solid line, the range of the output that engine 100 is required to provide (e.g., the Pe range) is never limited as done for small actuation range 500c.

Referring back to FIG. 10, control device 200 proceeds to Step S130 to determine whether intake valve 118 has the actuation characteristic fixed in large actuation range 500a. Furthermore, control device 200 proceeds to Step S140 to determine whether intake valve 118 has the actuation characteristic fixed in intermediate actuation range 500b.

Control device 200 follows the decisions made in Steps S120 to S140, and when the intake valve does not have the actuation characteristic fixed (NO in S120), control device 200 proceeds to Step S150 to set the Pe range and the controlled target SOC to a default value.

In that case, required engine power Pe has maximum value Pmax set to P1 (Pmax=P1) and minimum value Pmin set to P0 (Pmin=P0). P1 corresponds to a maximum value of engine power that engine 100 in a normal state can output. Furthermore, normally, P0=0. This allows required engine power Pe to be set to reduce the engine's output power to be close to zero. Furthermore, in Step S150, a controlled center SOC value Sth=S0 is set.

Control device 200 follows the decisions made in Steps S120 to S140, and when the intake valve has the actuation characteristic fixed in small actuation range 500c (YES in S120 and NO in S130 and S140), control device 200 proceeds to Step S170 to set a Pe range and a controlled target SOC. In Step S170, Pmax=P3, wherein P3<P1, and Pmin=P4, wherein P4>P0, are set. Furthermore, controlled center SOC value Sth=S2 is set, wherein S2>S0. This provides a Pe range having more limited upper and lower limits and a higher controlled target SOC than when the intake valve does not have the actuation characteristic fixed.

When the intake valve has the actuation characteristic fixed in intermediate actuation range 500b (YES in S120 and S140 and NO in S130), control device 200 proceeds to Step S160 to set a Pe range and a controlled target SOC.

In Step S160, Pmax=P2, wherein P3<P2<P1, and Pmin=P0 are set. Furthermore, controlled center SOC value Sth=S1, wherein S2>S1>S0, is set. This provides a Pe range having a more limited upper limit and a higher controlled target SOC than when the intake valve does not have the actuation characteristic fixed.

When the intake valve has the actuation characteristic fixed in large actuation range 500a (YES in S120 and S130), control device 200 proceeds to Step S150 to follow the default value to set a Pe range and a controlled target SOC in accordance with the default value. This sets the Pe range and the controlled target SOC to be equivalent to those applied when the intake valve does not have the actuation characteristic fixed.

Figure 12:
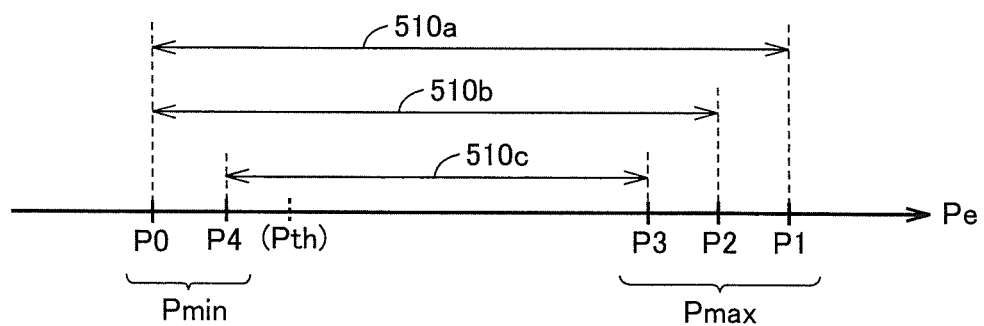
FIG. 12 is a representation for comparing ranges applied depending on the VVL device's state to set required engine power therewithin.
Figure 13:
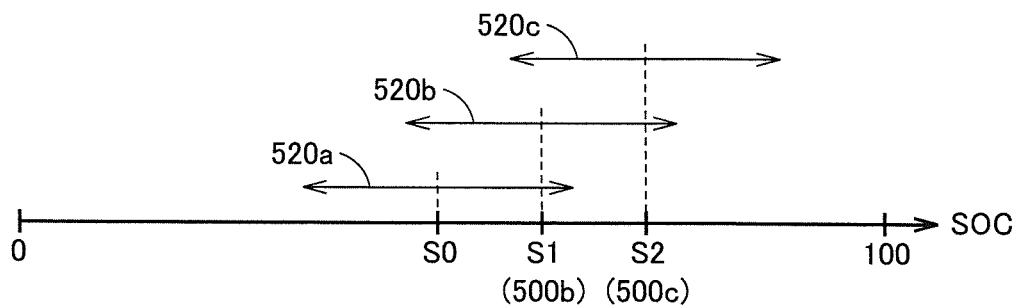
FIG. 13 is a representation for comparing controlled target SOCs depending on the VVL device's state.

Reference will now be made to FIG. 12 and FIG. 13 to compare Pe ranges and controlled target SOCs set in Steps S150 to S170 depending on the state of VVL device 400. FIG. 12 is a representation for comparing ranges applied to set required engine power therewithin. FIG. 13 is a representation for comparing controlled target SOCs.

With reference to FIG. 12, when intake valve 118 does not have the actuation characteristic fixed but normally controlled, the default value is followed to determine that a range 510a is applied to set required engine power Pe therewithin. As has been described above, range 510a (P0 to P1) corresponds to a range of power that engine 100 in the normal state can output.

In contrast, when the intake valve has the actuation characteristic fixed in small actuation range 500c or intermediate actuation range 500b, in particular, required engine power Pe is determined within a range 510b or a range 510c. Ranges 510b and 510c are narrower than when the default value is followed, i.e., when the intake valve does not have the actuation characteristic fixed, i.e., ranges 510b and 510c are narrower than range 510a. This can prevent required engine power Pe from being set in a range larger than a maximum value of power that the engine can output when the intake valve has the actuation characteristic fixed in small actuation range 500c or intermediate actuation range 500b providing reduced torque in a high engine speed range. In particular, range 510c has Pmin=P4, wherein P4>P0, which can prevent required engine power Pe from being set in a range smaller than a minimum value of power that the engine can output when the intake valve has the actuation characteristic fixed in small actuation range 500c.

In contrast, when the intake valve has the actuation characteristic fixed in small actuation range 500c, which corresponds to range 510c, required engine power Pe is set in a range (a Pe range) narrower than when the intake valve has the actuation characteristic fixed in intermediate actuation range 500b, which corresponds to range 510b.

When intermediate actuation range 500b is compared with small actuation range 500c, the former allows a maximum value of power that the engine can output for a high engine speed range to be increased, and the former also allows engine torque to be reduced for a low engine speed range, which allows a wider engine power range to be available. Thus when intake valve 118 has the actuation characteristic fixed in intermediate actuation range 500b, an output that engine 100 is required to provide can be provided within a less limited (Pe) range to allow engine 100 to be more effectively used.

In contrast, when the intake valve has the actuation characteristic fixed in large actuation range 500a, then, range 510a (P0 to P1) is applied so that the range of the output that engine 100 is required to provide, i.e., the Pe range, is set to be equivalent to that applied when the intake valve does not have the actuation characteristic fixed.

Note that for small actuation range 500c, required engine power Pe has minimum value Pmin of P4, which may be smaller than threshold value Pth referred to in determining whether to start the engine (see the FIG. 9 Step S450). This allows engine 100 to be also intermittently operated when intake valve 118 has the actuation characteristic fixed in small actuation range 500c.

With reference to FIG. 13, when intake valve 118 does not have the actuation characteristic fixed but normally controlled, the default value is followed to set a controlled target SOC with controlled center value Sth=S0. For example, S0 is set to approximately 50(%) to ensure both a room for accepting electric power regenerated by motor generator MG2 and that motor generator MG2 outputs power when acceleration is requested.

In contrast, when the intake valve has the actuation characteristic fixed in small actuation range 500c or intermediate actuation range 500b, in particular, controlled center SOC value Sth is set to S1 or S2 higher than default value S0. This allows power storage device B to have an SOC controlled to be higher than when intake valve 118 does not have the actuation characteristic fixed but normally controlled.

When the intake valve has the actuation characteristic fixed in small actuation range 500c or intermediate actuation range 500b and the engine torque in the high engine speed range is accordingly reduced, then, travelling in that driving range requires motor generators MG1 and MG2 to provide an output to ensure total required power Pttl. In that case, power storage device B outputs electric power to allow motor generators MG1 and MG2 to output torque, and power storage device B is thus reduced in SOC. Raising the controlled target SOC to be higher than normal to allow power storage device B to have an SOC controlled to be higher allows the vehicle to be driven continuously in a high output range without excessively reduced SOC.

Furthermore, when intake valve 118 has the actuation characteristic fixed in small actuation range 500c, controlled center SOC value Sth is set to be further higher than controlled center SOC value Sth that is set when the intake valve has the actuation characteristic fixed in intermediate actuation range 500b, or S1, i.e., S2 is set, wherein S2 is larger than S1. For example, S1 is set to approximately 65(%), and S2 is set to approximately 70(%).

When intermediate actuation range 500b is compared with small actuation range 500c, the former allows an actually outputtable engine power with a larger maximum value than the latter does. This reduces an amount of SOC that is reduced when the vehicle is driven in a high output range. Thus when intake valve 118 has the actuation characteristic fixed in intermediate actuation range 500b, the controlled target SOC (or controlled center SOC value) can be lower than when the intake valve has the actuation characteristic fixed in small actuation range 500c. Thus, excessively reducing a room for accepting regenerated electric power can be avoided and enhanced energy efficiency (or fuel efficiency) can be achieved.

In contrast, when the intake valve has the actuation characteristic fixed in large actuation range 500a, then, the controlled center SOC value is set in accordance with the default value (Sth=S0) to be equivalent to that applied when the intake valve does not have the actuation characteristic fixed. When the intake valve has the actuation characteristic fixed in large actuation range 500a, the engine does not provide power insufficient for the high output range, and accordingly, power storage device B is not required to have an SOC set to be high. Thus a room for accepting regenerated electric power can be ensured, similarly as it can when intake valve 118 has the actuation characteristic normally controlled, for enhanced energy efficiency (or fuel efficiency).

Note that while in the above description the controlled target SOC is controlled center value Sth, it may be replaced with a controlled target SOC range. In that case, when power storage device B has an SOC deviating from the controlled target SOC range and thus increasing, then, in Step S300, Pchg<0 is set to discharge power storage device B. In contrast, when power storage device B has an SOC deviating from the controlled target SOC range and thus decreasing, then, Pchg>0 is set to charge power storage device B.

When intake valve 118 does not have the actuation characteristic fixed but normally controlled, a controlled target SOC range 520a is set as a default value. In contrast, when intake valve 118 has the actuation characteristic fixed in intermediate actuation range 500b, a controlled target SOC range 520b is set. Controlled target SOC range 520b is set at a side higher in SOC than controlled target SOC range 520a.

Furthermore, when intake valve 118 has the actuation characteristic fixed in small actuation range 500c, a controlled target SOC range 520c is set. Controlled target SOC range 520c is set at a side higher in SOC than controlled target SOC range 520b.

In contrast, when intake valve 118 has the actuation characteristic fixed in large actuation range 500a, controlled target SOC range 520a is set, as done when the intake valve does not have the actuation characteristic fixed.

Thus when controlled target SOC ranges 520a to 520c are compared, range 520a has an upper limit value set highest, range 520b has an upper limit value set second highest, and range 520c has an upper limit value set lowest. Thus, similarly as done when a controlled center SOC value is set, as described above, when intake valve 118 has the actuation characteristic fixed, power storage device B can have an SOC previously controlled to be high for preparing for insufficient engine power for the high output range.

Note that while FIG. 13 shows controlled target SOC ranges 520a to 520c also having lower limit values, respectively, with a difference therebetween, the ranges may have lower limit values, respectively, of a single value in light of a function allowing power storage device B to have an SOC previously controlled to be high, as described above.

Thus the first embodiment provides a hybrid vehicle including engine 100 having intake valve 118 with an actuation characteristic (or lifted in an amount and/or worked by a working angle) such that when intake valve 118 has the actuation characteristic (i.e., the amount and the angle) fixed, engine 100 has its output (or power) limited in accordance with the fixed actuation characteristic, and correspondingly, an output that engine 100 is required to provide (e.g., required engine power Pe) is set within a narrowed range. Furthermore, the vehicle can have a power storage device previously controlled to be high in SOC to prepare for insufficient engine power for a high output range. Thus while the vehicle including engine 100 having intake valve 118 with an actuation characteristic has the actuation characteristic fixed, engine 100 can be operated to avoid excessively increased/decreased SOC that would lead to impaired fuel efficiency, incapability of travelling and the like preventing the vehicle from continuing to travel.

Furthermore, when intake valve 118 has the actuation characteristic fixed and is accordingly worked by a large working angle and lifted in a large amount, limiting a range applied to set therewithin an output that engine 100 is required to provide (e.g., required engine power Pe), and increasing a controlled target SOC are alleviated or avoided to allow engine 100's output to be effectively used and a room to be increased for accepting regenerated electric power to allow the vehicle to continue to travel while minimizing impaired fuel efficiency.

Second Embodiment

Figure 14:
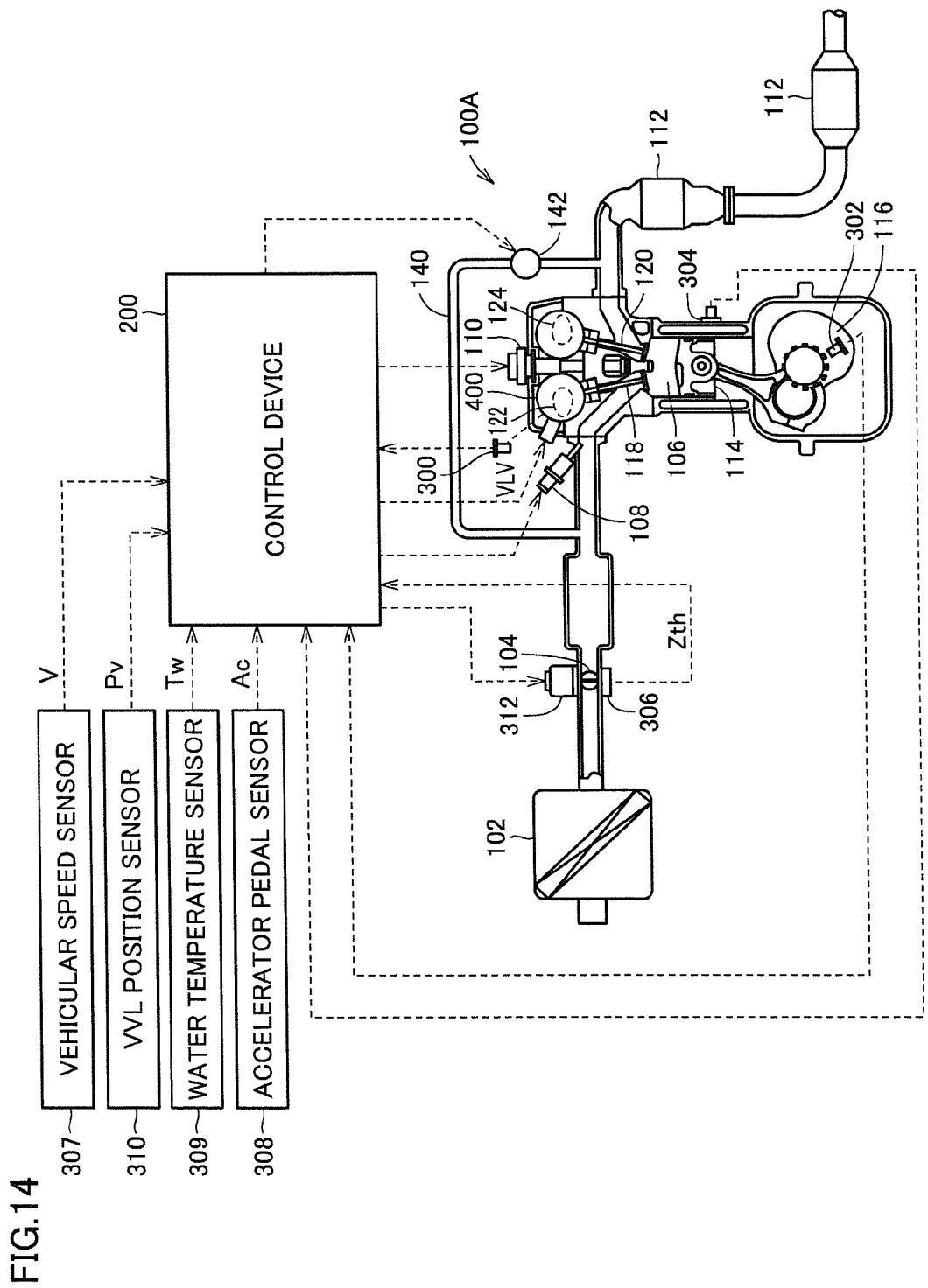
FIG. 14 shows a configuration of an engine of a hybrid vehicle according to a second embodiment.

FIG. 14 shows a configuration of an engine of a hybrid vehicle according to a second embodiment. The second embodiment provides a hybrid vehicle in the FIG. 1 configuration except that engine 100 shown in FIG. 2 is replaced with an engine 100A shown in FIG. 14.

With reference to FIG. 14, when engine 100A is compared in configuration with engine 100 shown in FIG. 2, the former further includes an exhaust gas recirculation (EGR) device.

The EGR device includes an EGR path 140 and an EGR valve 142. EGR path 140 is a pipeline for allowing engine 100A to recirculate exhaust gas to an intake side (e.g., an intake manifold). EGR valve 142 is provided in EGR path 140 and opened/closed as controlled by control device 200. In other words, the second embodiment provides a hybrid vehicle with control device 200 having a function that controls engine 100 according to the first embodiment plus a function to control opening and closing EGR valve 142.

When EGR valve 142 is opened, EGR path 140 brings an exhaust path and an intake path into communication, and when EGR valve 142 is closed, EGR path 140 is shut off. Opening EGR valve 142 to recirculate exhaust gas to the intake path can reduce throttle loss and reduce pumping loss. The EGR device thus allows enhanced fuel efficiency.

As the second embodiment provides a hybrid vehicle comprising engine 100A including an EGR device, the EGR device is also controlled depending on the state of VVL device 400. As has been described with reference to FIG. 6, when intake valve 118 is lifted in a large amount and worked by a large working angle, a reduced compression ratio is provided, and accordingly, relatively reduced combustibility is provided. Accordingly, when intake valve 118 has the actuation characteristic fixed such that it is lifted in the large amount and worked by the large working angle, operating the EGR device to recirculate exhaust gas to the side taking air in may result in further reduced combustibility.

The hybrid vehicle according to the second embodiment is also controlled in accordance with the FIG. 9 flowchart for travelling. Note, however, that control device 200 performs the FIG. 9 Step S100 with the FIG. 10 process replaced with a process shown in FIG. 15.

Figure 15:
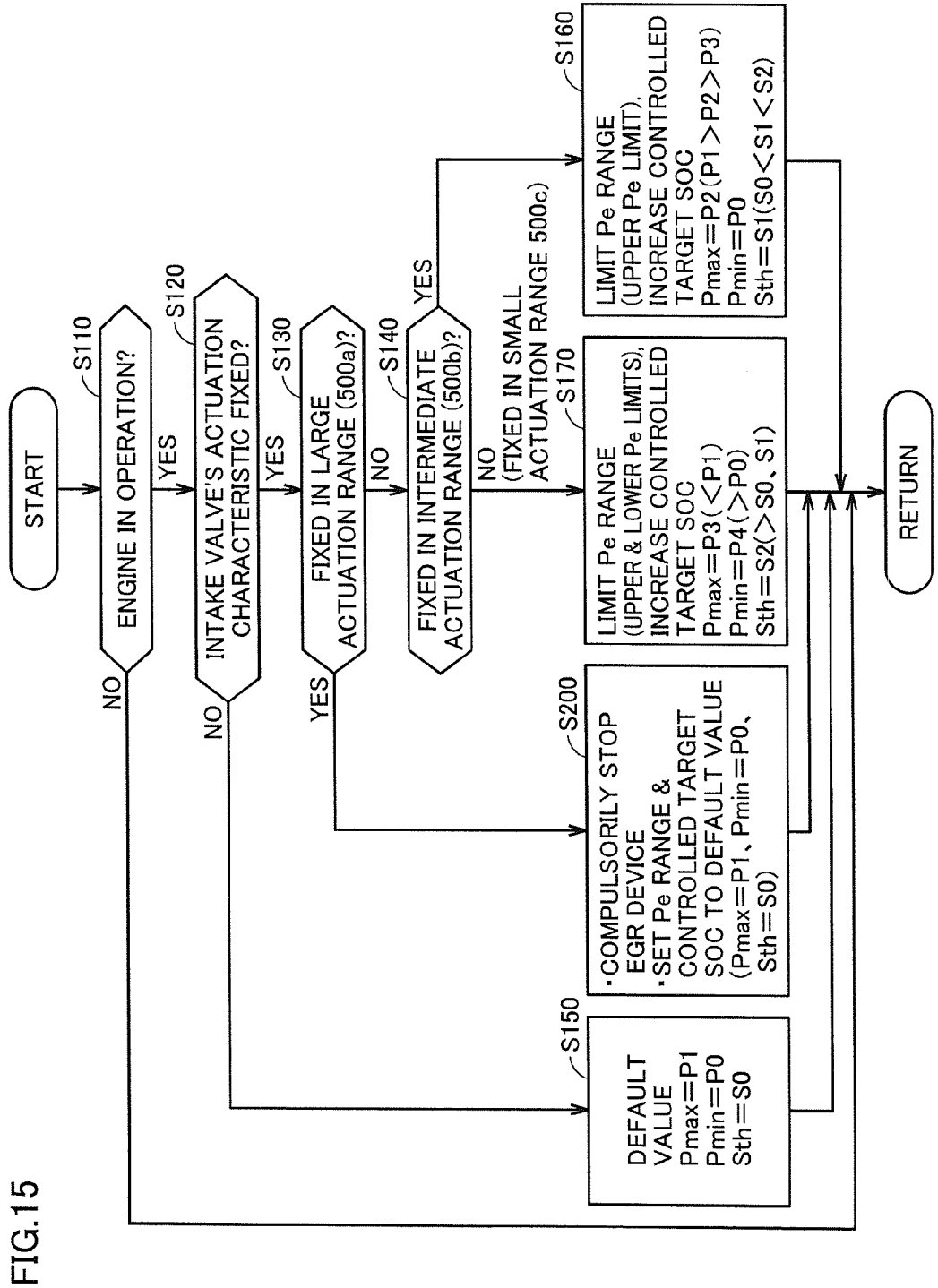
FIG. 15 is a flowchart of a first example of a process for setting a Pe range and a controlled target SOC depending on a VVL device's state in the hybrid vehicle according to the second embodiment.

Comparing FIG. 15 with FIG. 10, in the second embodiment when intake valve 118 has the actuation characteristic fixed in large actuation range 500a, i.e., when a decision of YES is made in Step S130, a different step is then performed. Specifically, when intake valve 118 has the actuation characteristic fixed in large actuation range 500a, control device 200 proceeds to Step S200.

Control device 200 in Step S200 sets a Pe range and a controlled target SOC to the default value, similarly as done in Step S150. Furthermore, control device 200 holds EGR valve 142 closed to compulsorily stop the EGR device from operating.

Thus when intake valve 118 has the actuation characteristic fixed with a small compression ratio (or in large actuation range 500a), the EGR device is prevented from recirculating exhaust gas and thus providing further reduced combustibility.

Figure 16:
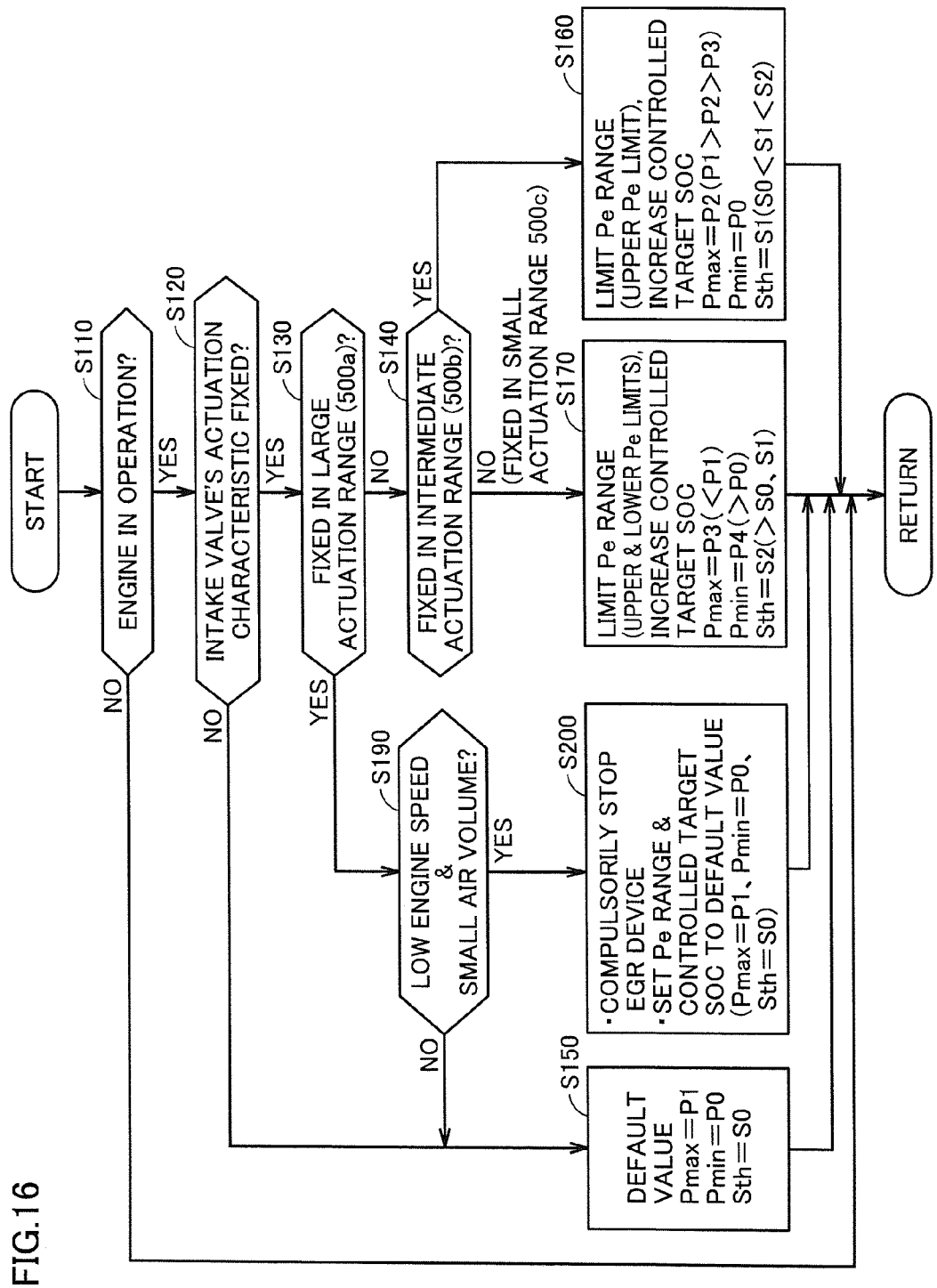
FIG. 16 is a flowchart of a second example of the process for setting the Pe range and the controlled target SOC depending on the VVL device's state in the hybrid vehicle according to the second embodiment.

Alternatively, control device 200 can perform the FIG. 9 Step S100 with the FIG. 15 process replaced with a process shown in FIG. 16.

When FIG. 16 is compared with FIG. 15, the FIG. 16 process is performed as follows: When intake valve 118 has the actuation characteristic fixed in large actuation range 500a (YES in S130), control device 200 further performs Step S190.

Control device 200 in Step S190 determines whether engine 100A has low engine speed and small air volume. For example, when the engine currently has an engine speed Ne lower than a prescribed threshold value Nth (i.e., Ne<Nth) and an intake air volume Q smaller than a threshold value Qth (i.e., Q<Qth), control device 200 can make a decision of YES in Step S190. When engine 100A has low engine speed and small air volume (YES in S190), control device 200 proceeds to step S200, similarly as done in FIG. 15. This provides a Pe range and controlled target SOC set to the default value and also holds EGR valve 142 closed to compulsorily stop the EGR device from operating.

In contrast, when engine 100A does not have both low engine speed and small air volume (NO in S190), control device 200 proceeds to step S150 while intake valve 118 has the actuation characteristic fixed in large actuation range 500a. In other words, while the control device provides a Pe range and controlled target SOC set to the default value, the control device allows the EGR device to continue to operate. Accordingly, EGR valve 142 is angularly controlled, as done when the engine is normally controlled.

In the FIG. 16 process, when intake valve 118 has the actuation characteristic fixed in large actuation range 500a, operating the EGR device can compulsorily be stopped only for an operational state for which reduced combustibility is particularly a concern, i.e., only when engine 100A has low engine speed and small air volume.

Note that in FIG. 15 and FIG. 16 when intake valve 118 does not have the actuation characteristic fixed in large actuation range 500a, i.e., when intake valve 118 does not have the actuation characteristic fixed at all or has the actuation characteristic fixed in intermediate actuation range 500b or small actuation range 500c, how the vehicle is controlled (S150 to S170) is done similarly as has been described in the first embodiment, and accordingly, will not be described repeatedly.

Accordingly, the second embodiment provides a hybrid vehicle including engine 100A provided with VVL device 400 and an EGR device and having intake valve 118 with an actuation characteristic (or lifted in an amount and worked by a working angle) such that when the intake valve has the actuation characteristic (i.e., the amount and the angle) fixed, the EGR device can be prevented from operating to contribute to reduced combustibility and thus destabilize engine 100's operation, and in addition, as has been described in the first embodiment, the engine can be operated to avoid excessively increased/decreased SOC to allow the vehicle to continue to travel.

In the FIG. 16 process, in particular, when intake valve 118 has the actuation characteristic fixed in large actuation range 500a, operating the EGR device can compulsorily be stopped only when engine 100A is in an operational state for which reduced combustibility is particularly a concern, i.e., only when the engine has low engine speed and small air volume. This can minimize compulsorily stopping the EGR device and thus losing the EGR effect.

VVL Device in Exemplary Variation

In the first and second embodiments intake valve 118 may be lifted in an amount and worked by a working angle which may vary continuously (or steplessly) as described above or may be set discretely (or stepwise).

Figure 17:
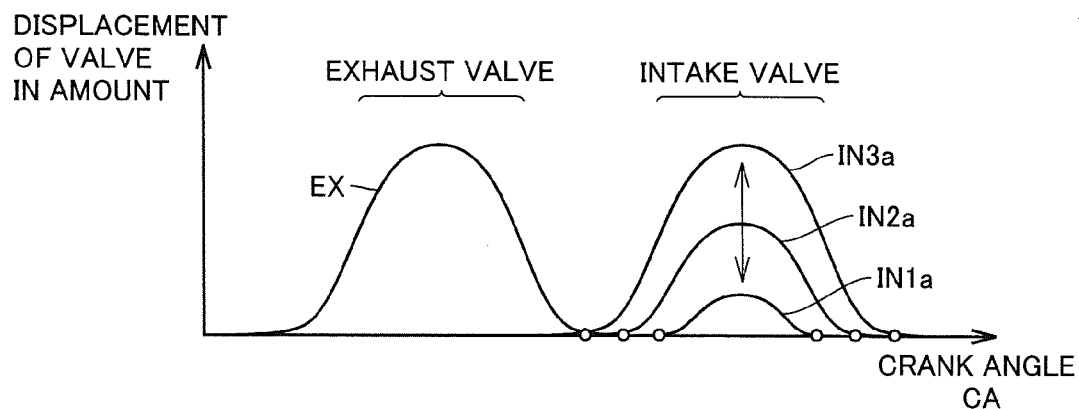
FIG. 17 represents a relationship between the intake valve's displacement in amount and crank angle, as implemented in a VVL device that can vary the intake valve's actuation characteristic in three levels.

FIG. 17 represents a relationship between the valve's displacement in amount and crank angle, as implemented by a VVL device 400A that can vary intake valve 118's actuation characteristic in three levels.

VVL device 400A is capable of varying the actuation characteristic to any one of first to third characteristics. The first characteristic is represented by a waveform IN1a. The second characteristic is represented by a waveform IN2a and corresponds to a larger amount of lift and a larger working angle than the first characteristic. The third characteristic is represented by a waveform IN3a and corresponds to a larger amount of lift and a larger working angle than the second characteristic.

Figure 18:
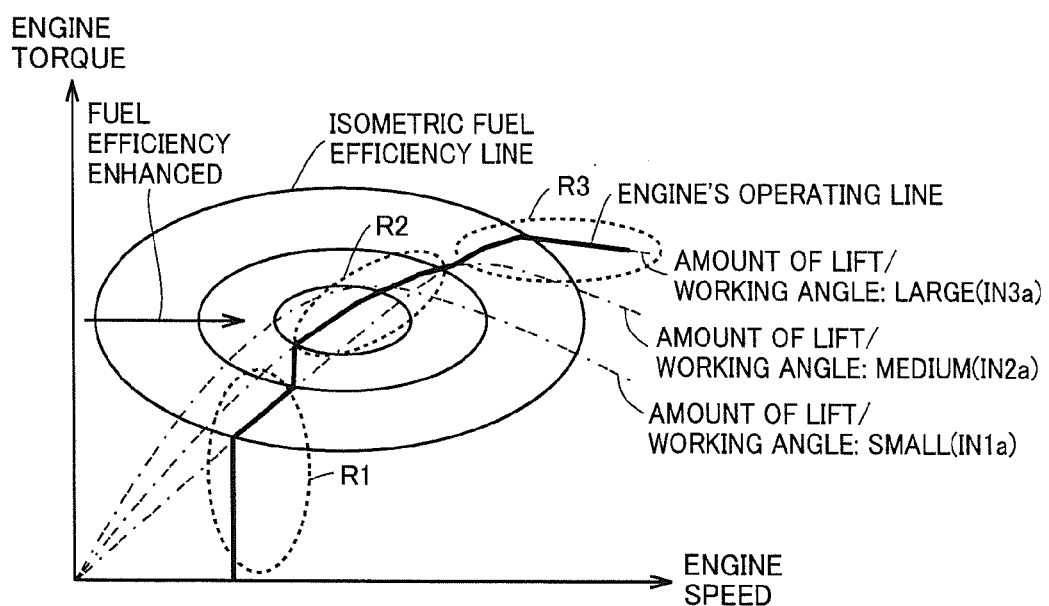
FIG. 18 shows an operating line of an engine including a VVL device having the actuation characteristic shown in FIG. 17.

FIG. 18 shows an operating line of an engine including a VVL device having the actuation characteristic shown in FIG. 17.

In FIG. 18, the axis of abscissa represents engine speed and the axis of ordinate represents engine torque. Note that in FIG. 18, alternate long and short dashed lines indicate torque characteristics corresponding to the first to third characteristics (IN1a to IN3a). Furthermore, in FIG. 18, a circle indicated by a solid line indicates an isometric fuel efficiency line. The isometric fuel efficiency line indicates connected points equal in fuel consumption, and a point closer to the center of the circle corresponds to more enhanced fuel efficiency. Engines 100, 100A with VVL device 400A applied thereto are basically operated on an engine operating line indicated in FIG. 18 by a solid line, for the sake of illustration.

Herein, a range R1 indicates a low engine speed range, for which reducing a shock caused when the engine starts is important. Furthermore, engine 100A having VVL device 400A applied thereto can have EGR valve 142 held closed to contemplate enhanced fuel efficiency via the Atkinson cycle. Accordingly, the third characteristic (IN3a) may be selected as the actuation characteristic of intake valve 118 to provide an increased amount of lift and an increased working angle.

A range R2 indicates a medium engine speed range, for which the EGR is applied to introduce exhaust gas in an increased amount for enhanced fuel efficiency. To do so, the second characteristic (IN2a) is selected as the actuation characteristic of intake valve 118 to provide a medium amount of lift and a medium working angle.

In other words, when intake valve 118 is lifted in a large amount and worked by a large working angle (i.e., the third characteristic is selected), enhancing fuel efficiency via the Atkinson cycle, rather than via the EGR, is prioritized. In contrast, when a medium amount of lift and a medium working angle are selected (i.e., the second characteristic is selected), enhancing fuel efficiency via the EGR, rather than via the Atkinson cycle, is prioritized.

A range R3 indicates a high engine speed range, for which intake inertia is exploited to introduce a large amount of air into the cylinder to provide an increased actual compression ratio for better output performance. Accordingly, the third characteristic (IN3a) is selected as the actuation characteristic of intake valve 118 to provide an increased amount of lift and an increased working angle.

When engines 100, 100A with VVL device 400A applied thereto are operated in the low engine speed range with a large load; engines 100, 100A with VVL device 400A applied thereto are started at cryogenic temperature; or a catalyst is warmed up, the first characteristic (IN1a) is selected as the actuation characteristic of intake valve 118 to provide a reduced amount of lift and a reduced working angle. Thus an amount of lift and a working angle are determined depending on how engines 100, 100A are operated.

When the hybrid vehicle having an engine mounted therein with VVL device 400A applied thereto to control intake valve 118 to have an actuation characteristic (or be lifted in an amount and worked by a working angle) has the actuation characteristic (or the amount and the angle) fixed for some reason at one of the first to third characteristics (IN1a to IN3a), the vehicle may have a problem, similarly as has been described in the first and second embodiments.

When VVL device 400A is applied, and intake valve 118 has the actuation characteristic fixed, the actuation characteristic will be fixed by any one of the first characteristic (IN1a), the second characteristic (IN2a), and the third characteristic (IN3a). In other words, the first characteristic (IN1a), the second characteristic (IN2a), and the third characteristic (IN3a) correspond to small actuation range 500c, intermediate actuation range 500b, and large actuation range 500a shown in FIG. 11.

The hybrid vehicle having engine 100 mounted therein with VVL device 400A applied thereto can also be controlled for travelling, similarly as has been described in the first embodiment with reference to the FIG. 9 flowchart. Note, however, that control device 200 performs the FIG. 9 Step S100 with the FIG. 10 process replaced with a process shown in FIG. 19.

Figure 19:
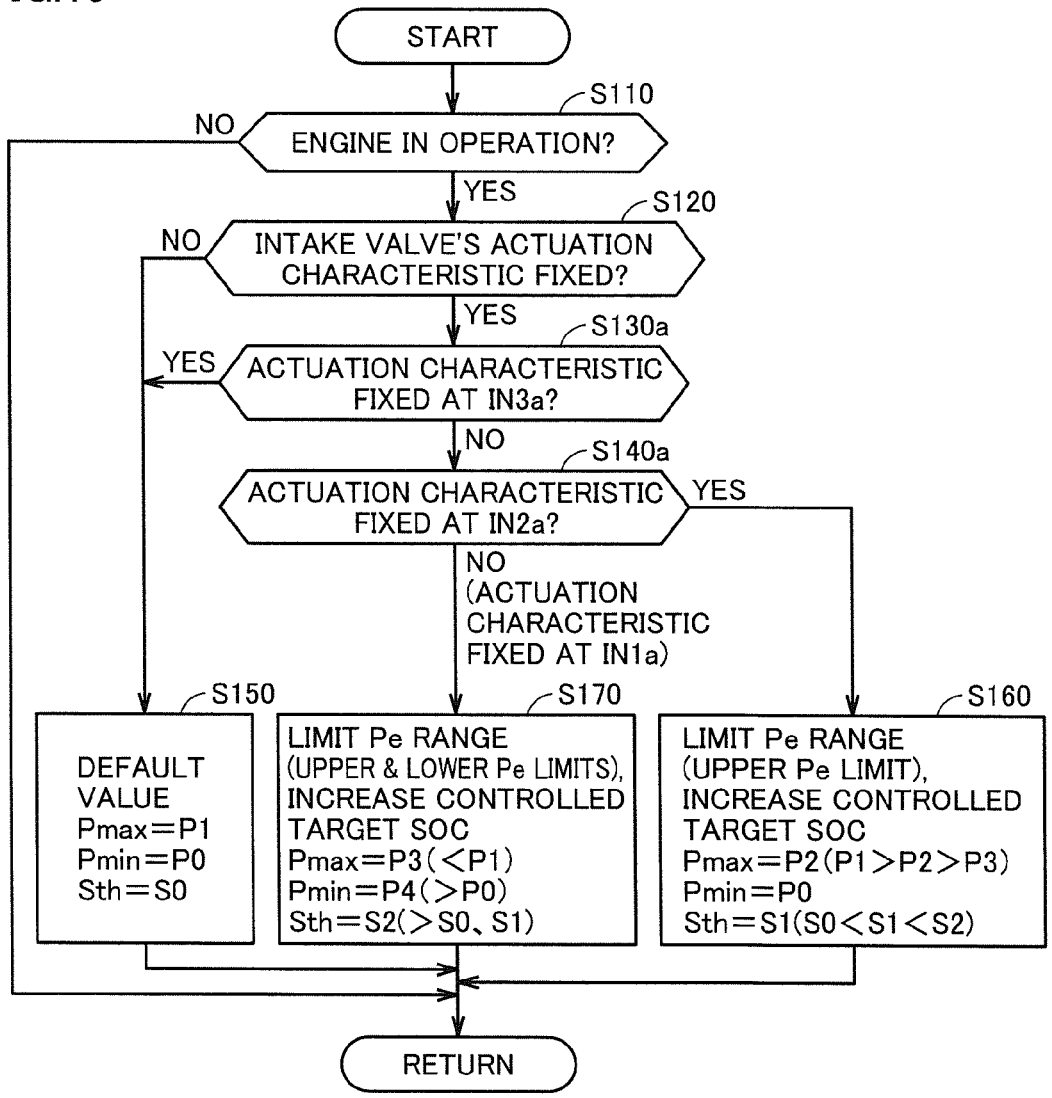
FIG. 19 is a flowchart of a process for controlling travelling according to the first embodiment having applied thereto the VVL device having the FIG. 17 actuation characteristic.

When FIG. 19 is compared with FIG. 10, control device 200 performs the process for stratifying the intake valve's fixed actuation characteristic with Steps S130 and S140 (see FIG. 10) replaced with Steps S130a and S140a.

Control device 200 in step S130a determines whether intake valve 118 has the actuation characteristic fixed at the third characteristic (IN3a) lifting the intake valve in a large amount and working the intake valve by a large working angle. Furthermore, control device 200 in step S140a determines whether intake valve 118 has the actuation characteristic fixed at the second characteristic (IN2a) lifting the intake valve in a medium amount and working the intake valve by a medium working angle.

When intake valve 118 has the actuation characteristic fixed at the third characteristic (IN3a), control device 200 proceeds to Step S150, similarly as done in the first embodiment when intake valve 118 has the actuation characteristic fixed in large actuation range 500a. Furthermore, when intake valve 118 has the actuation characteristic fixed at the second characteristic (IN2a), control device 200 proceeds to Step S160, similarly as done in the first embodiment when intake valve 118 has the actuation characteristic fixed in intermediate actuation range 500b. Furthermore, when intake valve 118 has the actuation characteristic fixed at the first characteristic (IN1a), control device 200 proceeds to Step S170, similarly as done in the first embodiment when intake valve 118 has the actuation characteristic fixed in small actuation range 500c.

Engine 100 having VVL device 400A applied thereto can thus also be controlled for travelling, as has been described in the first embodiment. As a result, when the vehicle including engine 100 having an intake valve with an actuation characteristic (or lifted in an amount and worked by a working angle, as) controlled by VVL device 400A, has the actuation characteristic (or the amount and the angle) fixed, engine 100 can be operated to avoid excessively increased/decreased SOC that would lead to impaired fuel efficiency, incapability of travelling and the like preventing the vehicle from continuing to travel.

Furthermore, the hybrid vehicle having engine 100A mounted therein with VVL device 400A applied thereto can also be controlled for travelling, similarly as has been described in the second embodiment with reference to the FIG. 9 flowchart. Note, however, that control device 200 performs the FIG. 9 Step S100 with the FIG. 10 process replaced with a process shown in FIG. 20, rather than that of FIG. 15 having been described in the second embodiment.

Figure 20:
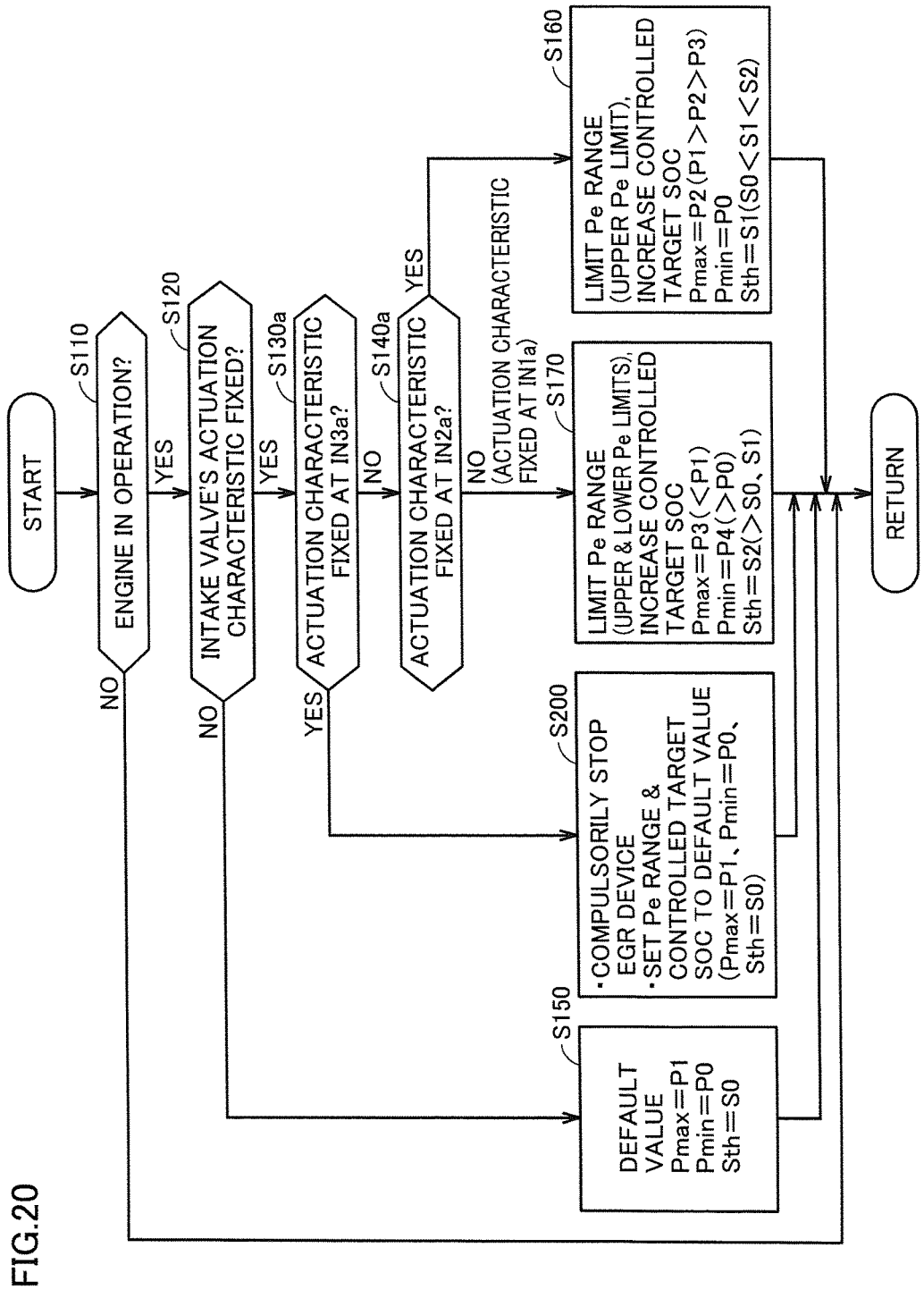
FIG. 20 is a flowchart of a first example of a process for controlling travelling according to the second embodiment having applied thereto a VVL device having the FIG. 17 actuation characteristic.

When FIG. 20 is compared with FIG. 15, control device 200 performs the process for stratifying the intake valve's fixed actuation characteristic with Steps S130 and S140 (see FIG. 15) replaced with Steps S130a and S140a. Steps S130a and S140a are similar to those of FIG. 19, and accordingly, will not be described repeatedly.

Thus, when engine 100A having VVL device 400A applied thereto has intake valve 118 with the actuation characteristic fixed at the third characteristic (IN3a), control device 200 proceeds to Step S200 to compulsorily stop the EGR device from operating, similarly as done in the second embodiment when intake valve 118 has the actuation characteristic fixed in large actuation range 500a. Furthermore, when intake valve 118 has the actuation characteristic fixed at the first characteristic (IN1a) or the second characteristic (IN2a), control device 200 can set a range of an output that engine 100 is required to provide (or a Pe range) and a controlled target SOC, similarly as done in the first and second embodiments when intake valve 118 has the actuation characteristic fixed in small actuation range 500c or intermediate actuation range 500b.

Figure 21:
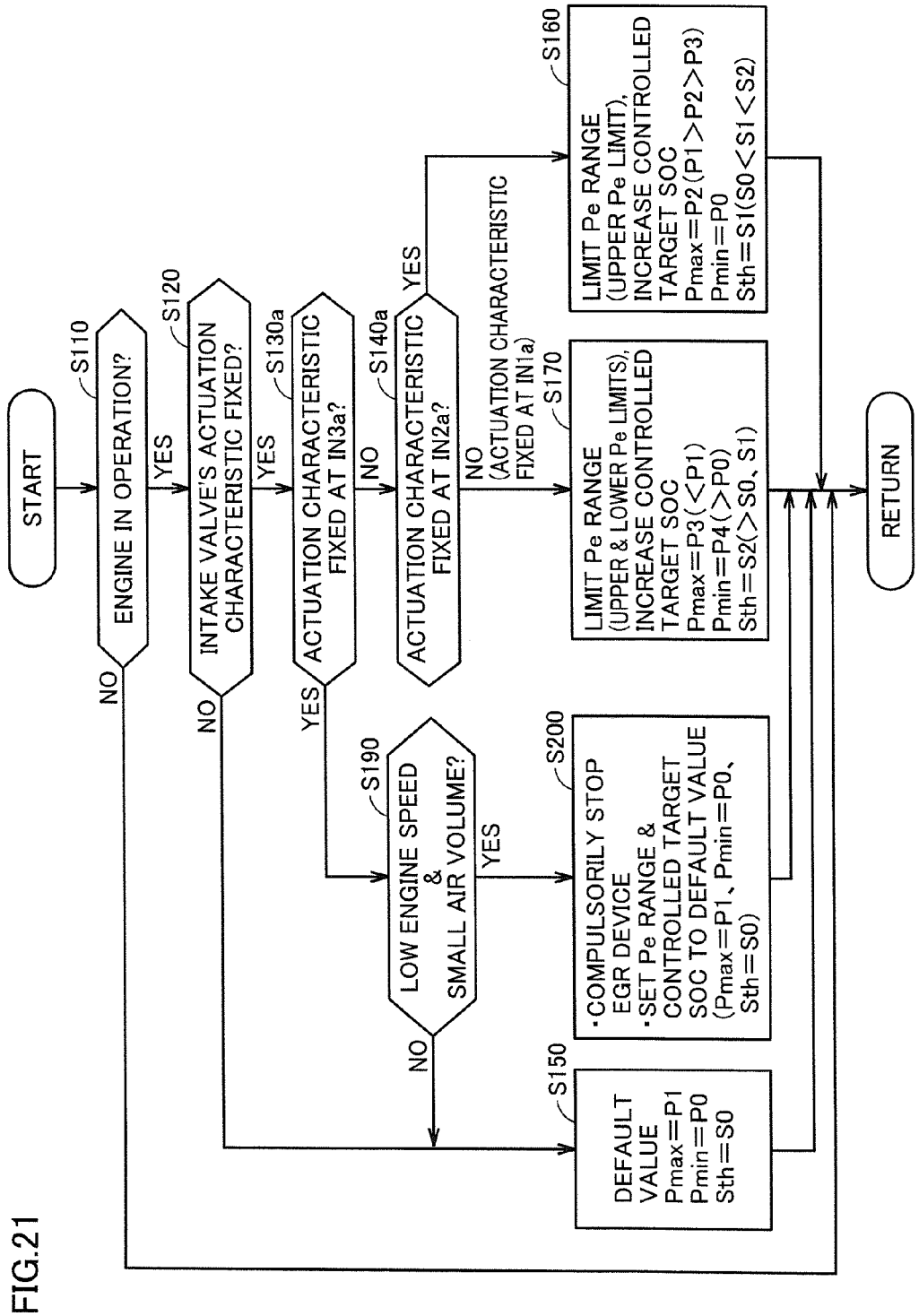
FIG. 21 is a flowchart of a second example of the process for controlling travelling according to the second embodiment having applied thereto the VVL device having the FIG. 17 actuation characteristic.

Alternatively, control device 200 can perform the FIG. 9 Step S100 with the FIG. 10 process replaced with a process shown in FIG. 21, rather than that shown in FIG. 20.

When FIG. 21 is compared with FIG. 20, the FIG. 21 process is performed as follows: When intake valve 118 has the actuation characteristic fixed at the third characteristic (IN3a) (YES in S130a), control device 200 further performs Step S190, similarly as done in FIG. 16. Only when engine 100A having VVL device 400A applied thereto has low engine speed and small air volume (YES in S190), control device 200 proceeds to step S200 similar to that of FIGS. 15 and 16. This provides a Pe range and controlled target SOC set to the default value and also holds EGR valve 142 closed to compulsorily stop the EGR device from operating.

In contrast, when engine 100A does not have both low engine speed and small air volume (NO in S190), control device 200 proceeds to step S150 while intake valve 118 has the actuation characteristic fixed at the third characteristic (IN3a). The control device provides a Pe range and controlled target SOC set to the default value, while the control device allows the EGR device to continue to operate. In other words, EGR valve 142 is angularly controlled, as done when the engine is normally controlled.

Engine 100A having VVL device 400A applied thereto can thus also be controlled for travelling, similarly as has been described in the second embodiment. Consequently, when intake valve 118 having an actuation characteristic (or lifted in an amount and worked by a working angle) as controlled by VVL device 400A has the actuation characteristic (i.e., the amount and the angle) fixed thereby, the EGR device can be prevented from operating to contribute to reduced combustibility and thus destabilize engine 100's operation, and in addition, the engine can be operated to avoid excessively increased/decreased SOC that would lead to impaired fuel efficiency, incapability of travelling, and the like.

In the FIG. 21 process, in particular, when intake valve 118 has the actuation characteristic fixed at the third characteristic (IN3a), operating the EGR device can compulsorily be stopped only when engine 100A is in an operational state for which reduced combustibility is particularly a concern, i.e., only when the engine has low engine speed and small air volume.

Engines 100, 100A having VVL device 400A applied thereto to allow intake valve 118 to have the actuation characteristic switched in three levels, can thus also be controlled for travelling, as has been described in the first and second embodiments. Thus while the vehicle including engines 100, 100A having intake valve 118 with an actuation characteristic has the actuation characteristic fixed, engines 100, 100A can be operated to avoid excessively increased/decreased SOC that would lead to impaired fuel efficiency, incapability of travelling and the like preventing the vehicle from continuing to travel.

Note that when VVL device 400A is applied to engine 100A, intake valve 118 is lifted in an amount and worked by a working angle that are limited to three levels, and engine 100A can be operated in a state as controlled via a parameter adapted in a period of time shorter than required when intake valve 118 is lifted in a steplessly varying amount and worked by a steplessly varying working angle. Furthermore, a torque that an actuator requires to vary the amount of lifting intake valve 118 and the working angle on intake valve 118 can be reduced and the actuator can thus be reduced in size and weight. The actuator can thus also be produced at a reduced cost.

Figure 22:
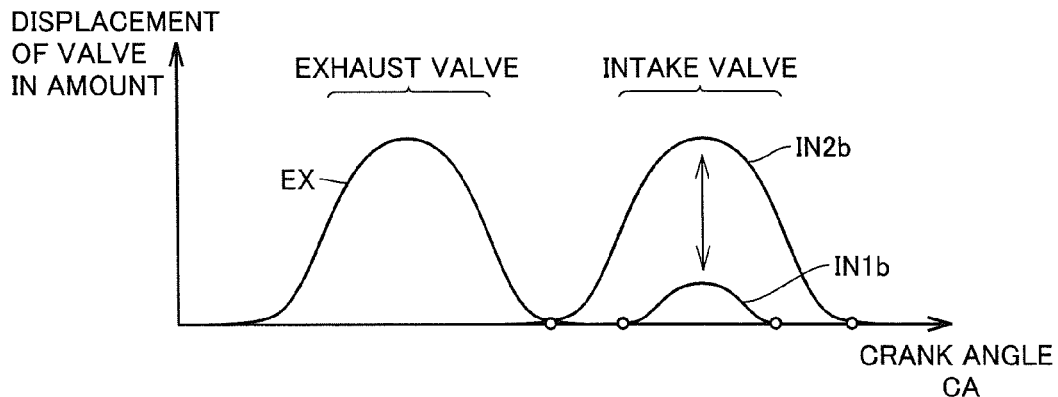
FIG. 22 represents a relationship between the intake valve's displacement in amount and crank angle, as implemented in a VVL device that can vary the intake valve's actuation characteristic in two levels.

FIG. 22 represents a relationship between the valve's displacement in amount and crank angle, as implemented by a VVL device 400B that can vary intake valve 118's actuation characteristic in two levels.

With reference to FIG. 22, VVL device 400B is capable of varying the actuation characteristic to any one of first and second characteristics. The first characteristic is represented by a waveform IN1b. The second characteristic is represented by a waveform IN2b and corresponds to a larger amount of lift and a larger working angle than the first characteristic.

When a hybrid vehicle having mounted therein an engine provided with VVL device 400B to control intake valve 118 to have an actuation characteristic (or be lifted in an amount and worked by a working angle) has the actuation characteristic fixed for some reason at one of the first and second characteristics (IN1b and IN2b), the vehicle may have a problem, similarly as has been described in the first and second embodiments.

The hybrid vehicle having engine 100 mounted therein with VVL device 400B applied thereto can also be controlled for travelling, similarly as has been described in the first embodiment with reference to the FIG. 9 flowchart. Note, however, that control device 200 performs the FIG. 9 Step S100 with the FIG. 10 process replaced with a process shown in FIG. 23.

Figure 23:
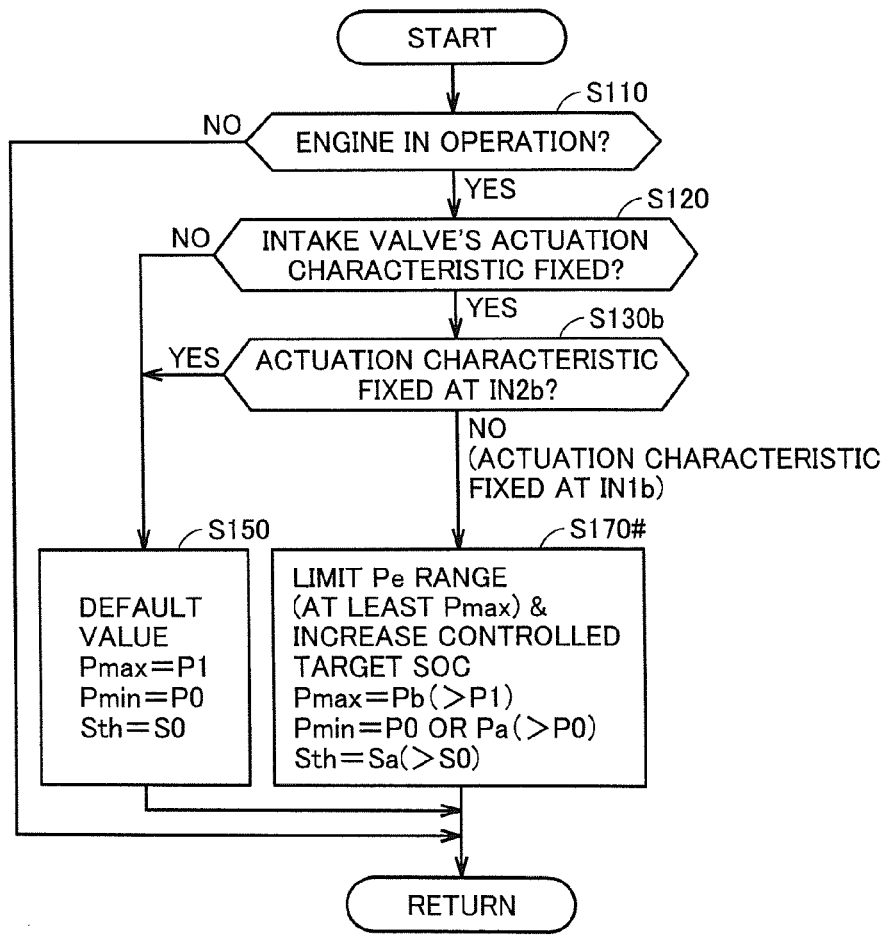
FIG. 23 is a flowchart of a process for controlling travelling according to the first embodiment having applied thereto a VVL device having the FIG. 22 actuation characteristic.

When FIG. 23 is compared with FIG. 10, control device 200 performs the process for stratifying the intake valve's fixed actuation characteristic with Steps S130 and S140 (see FIG. 10) replaced with Step S130b.

Control device 200 in step S130b determines whether intake valve 118 has the actuation characteristic fixed at the second characteristic (IN2b) lifting the intake valve in a large amount and working the intake valve by a large working angle. When intake valve 118 has the actuation characteristic fixed at the second characteristic (IN2b) (YES in S130b), control device 200 proceeds to Step S150. This provides a Pe range and controlled target SOC set in accordance with the default value to be equivalent to those applied when intake valve 118 does not have the actuation characteristic fixed but normally controlled (NO in S120). In Step S150, as has been described above, Pmax=P1 and Pmin=P0 are set. Furthermore, as the controlled target SOC, controlled center SOC value Sth=S0 is set.

In contrast, when intake valve 118 has the actuation characteristic fixed at the first characteristic (IN1 b) lifting the intake valve in a small amount and working the intake valve by a small working angle (NO in S130b), control device 200 proceeds to Step S170# to set a Pe range and a controlled target SOC. In step S170#, Pmax=Pb is set, wherein Pb>P1. Pmin is set to P0 or Pa, wherein Pa>0. That is, required engine power Pe is set in a range (a Pe range) narrower than when the intake valve does not have the actuation characteristic fixed.

Furthermore, the controlled center SOC value is set to a side higher in SOC than the default value. For example, it is set to controlled center SOC value Sth=Sa, wherein Sa>S0. This allows power storage device B to have an SOC controlled to be higher than when the intake valve does not have the actuation characteristic fixed. Note that, as has previously been described, the controlled center SOC value can also be replaced with a controlled target SOC range set to a side higher in SOC to control the SOC to be similarly high.

Engine 100 having VVL device 400B applied thereto can thus also be controlled for travelling, as has been described in the first embodiment. As a result, while the vehicle including engine 100 having an intake valve with an actuation characteristic (or lifted in an amount and worked by a working angle, as) controlled by VVL device 400B, has the actuation characteristic (or the amount and the angle) fixed, engine 100 can be operated to avoid excessively increased/decreased SOC that would lead to impaired fuel efficiency, incapability of travelling and the like preventing the vehicle from continuing to travel.

Furthermore, the hybrid vehicle having engine 100A mounted therein with VVL device 400B applied thereto can also be controlled for travelling, similarly as has been described in the second embodiment with reference to the FIG. 9 flowchart. Note, however, that control device 200 performs the FIG. 9 Step S100 with the FIG. 10 process replaced with a process shown in FIG. 24, rather than FIG. 15 having been described in the second embodiment.

Figure 24:
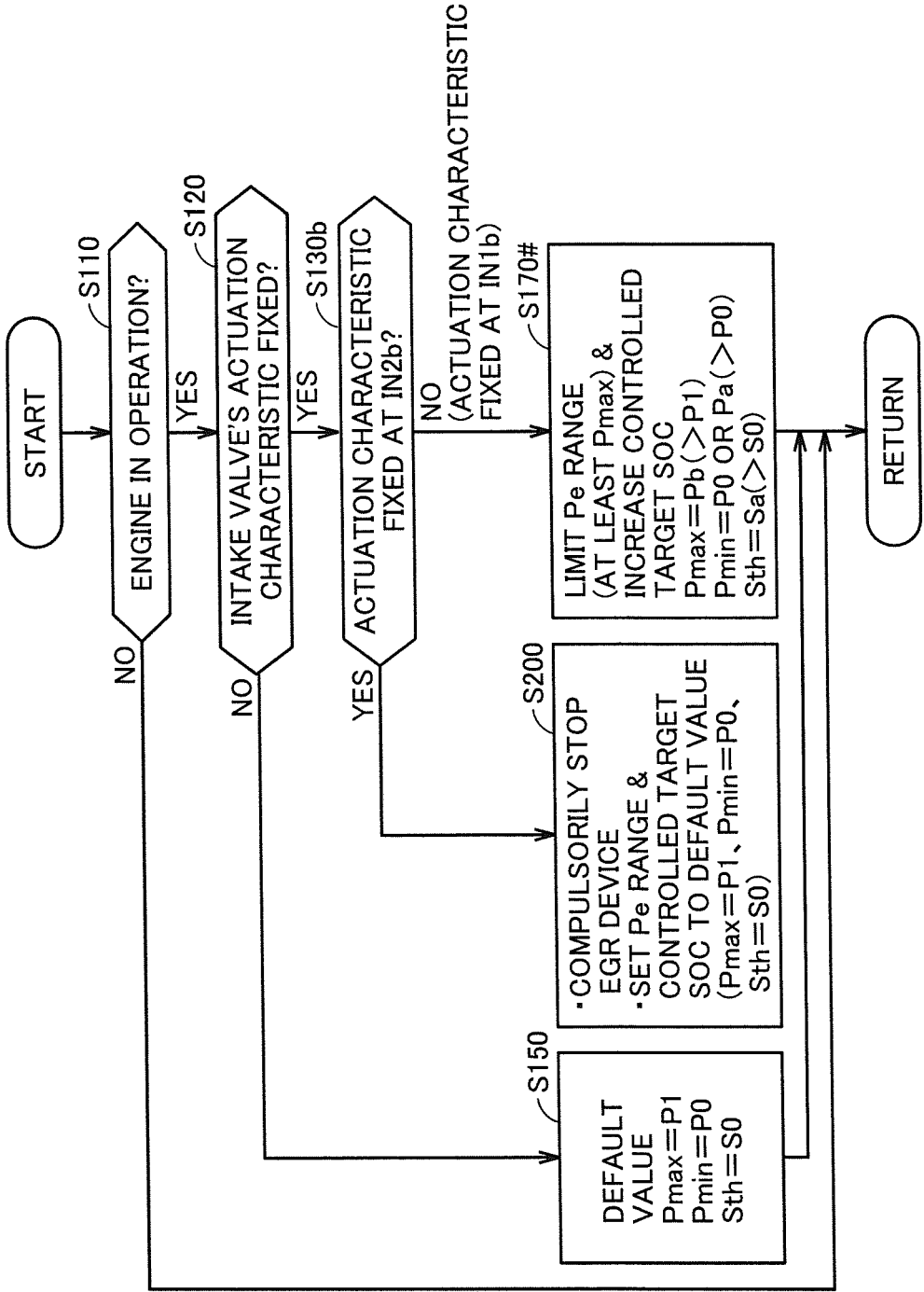
FIG. 24 is a flowchart of a first example of a process for controlling travelling according to the second embodiment having applied thereto the VVL device having the FIG. 22 actuation characteristic.

When FIG. 24 is compared with FIG. 15, control device 200 performs the process for stratifying the intake valve's fixed actuation characteristic with Steps S130 and S140 (see FIG. 15) replaced with Step S130b. Step S130b is similar to that of FIG. 23, and accordingly, will not be described repeatedly.

Thus, when engine 100A having VVL device 400B applied thereto has intake valve 118 with the actuation characteristic fixed at the second characteristic (IN2b), control device 200 proceeds to Step S200 to compulsorily stop the EGR device from operating, similarly as done in the second embodiment when intake valve 118 has the actuation characteristic fixed in large actuation range 500a. Furthermore, when intake valve 118 has the actuation characteristic fixed at the first characteristic (IN1b), control device 200 can proceed to Step S170# to set a Pe range and a controlled target SOC. Step S170# is similar to that of FIG. 23, and accordingly, will not be described repeatedly.

Figure 25:
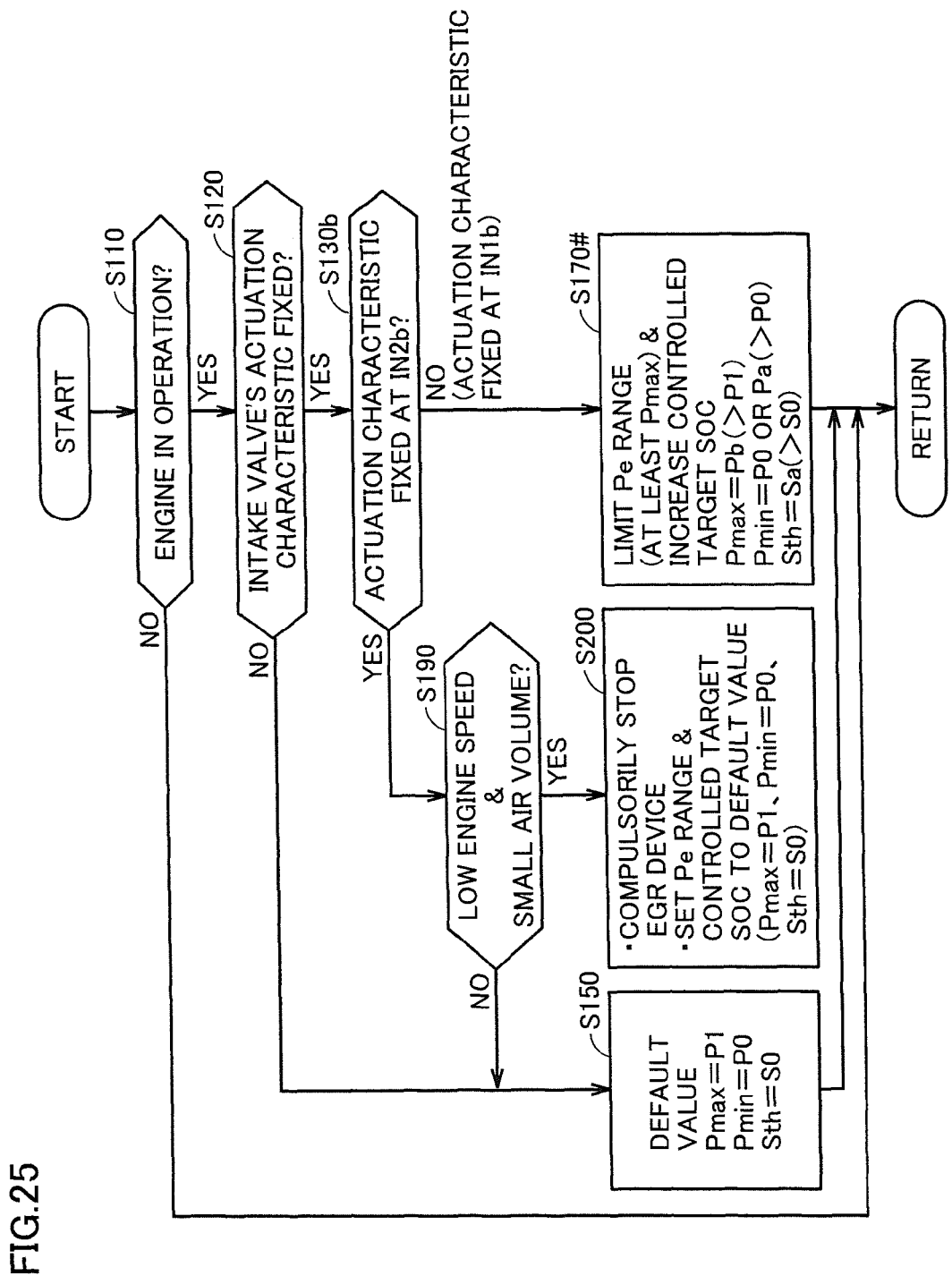
FIG. 25 is a flowchart of a second example of the process for controlling travelling according to the second embodiment having applied thereto the VVL device having the FIG. 22 actuation characteristic.

Alternatively, control device 200 can perform the FIG. 9 Step S100 with the FIG. 10 process replaced with a process shown in FIG. 25, rather than that shown in FIG. 24.

When FIG. 25 is compared with FIG. 24, the FIG. 25 process is performed as follows: When intake valve 118 has the actuation characteristic fixed at the second characteristic (IN2*b*) (YES in S130*b*), control device 200 further performs Step S190, similarly as done in FIGS. 16 and 21. Only when engine 100A having VVL device 400B applied thereto has low engine speed and small air volume (YES in S190), control device 200 proceeds to step S200, similarly as done in FIG. 24. This provides a Pe range and controlled target SOC set to the default value and also holds EGR valve 142 closed to compulsorily stop the EGR device from operating.

In contrast, when engine 100A does not have both low engine speed and small air volume (NO in S190), control device 200 proceeds to step S150 while intake valve 118 has the actuation characteristic fixed at the second characteristic (IN2*b*). In other words, while the control device provides a Pe range and controlled target SOC set to the default value, the control device allows the EGR device to continue to operate. In other words, EGR valve 142 is angularly controlled, as done when the engine is normally controlled.

Engine 100A having VVL device 400B applied thereto can thus also be controlled for travelling, similarly as has been described in the second embodiment. Consequently, when intake valve 118 having an actuation characteristic (or worked by a working angle and lifted in an amount) as controlled by VVL device 400B has the actuation characteristic (i.e., the amount and the angle) fixed, the EGR device can be prevented from operating to contribute to reduced combustibility and thus destabilize engine 100's operation, and in addition, the engine can be operated to avoid excessively increased/decreased SOC that would lead to impaired fuel efficiency, incapability of travelling, and the like.

Thus engines 100, 100A having VVL device 400B applied thereto to allow intake valve 118 to have the actuation characteristic switched in two levels can thus also be controlled for travelling, as has been described in the first and second embodiments, so that when intake valve 118 has the actuation characteristic fixed, engine 100 can be operated to avoid excessively increased/decreased SOC to thus allow the vehicle to continue to travel.

VVL device 400B allows intake valve 118 to be lifted in an amount and worked by a working angle that are limited to two actuation characteristics, and engine 100 can be operated in a state as controlled via a parameter adapted in a further shorter period of time. Furthermore, the actuator is also allowed to have a simpler configuration. Note that intake valve 118 may not be lifted in an amount or worked by a working angle that are limited to an actuation characteristic varying between two or three levels, and intake valve 118 may be lifted in an amount and worked by a working angle with an actuation characteristic varying between four or more levels.

While the above embodiments and their exemplary variations have been described for a case with the amount of lifting intake valve 118 and the working angle on intake valve 118 both controlled as an actuation characteristic thereof, the present disclosure is also applicable to a configuration with the amount of lifting intake valve 118 alone controllable (or variable) as an actuation characteristic thereof and a configuration with the working angle on intake valve 118 alone controllable (or variable) as an actuation characteristic thereof. A configuration that can control (or vary) either the amount of lifting intake valve 118 or the working angle on intake valve 118 can also be as effective as that which can vary both the amount of lifting intake valve 118 and the working angle on intake valve 118. Note that the configuration that can control (or vary) either the amount of lifting intake valve 118 or the working angle on intake valve 118 can be implemented via well known technology.

When either the amount of lifting intake valve 118 or the working angle on intake valve 118 is controllable (or variable), arranging VVL position sensor 310 to sense either the amount or the angle and determining for either the amount or the angle what is determined for both the amount and the angle in the embodiments allow a similar travelling control to be applied.

Thus, the present disclosure is applicable to a hybrid vehicle including a variable valve actuation device allowing intake valve 118 to have an actuation characteristic that is represented by an amount of lifting intake valve 118 and/or a working angle on intake valve 118, varying continuously (or steplessly) or discretely (or stepwise).

While the above embodiments have been described in connection with a series/parallel type hybrid vehicle capable of splitting the motive power of engine 100 by power split device 4 and thus transmitting the split motive power to driving wheel 6 and motor generators MG1 and MG2, the present disclosure is also applicable to hybrid vehicles of other types. More specifically, the present disclosure is for example also applicable to a so-called series type hybrid vehicle that uses engine 100 only to drive motor generator MG1 and generates vehicular driving force only by motor generator MG2, a hybrid vehicle recovering only regenerated energy of kinetic energy that is generated by engine 100 as electrical energy, a motor-assisted hybrid vehicle using an engine as a main driving force source and assisted by a motor as required, and the like. Furthermore, the present disclosure is also applicable to a hybrid vehicle which allows a motor to be disconnected and travels by the driving force of the engine alone.

Furthermore, the present embodiment has been described to describe an example of controlling an engine output on a power basis, the present disclosure is applicable to controlling an engine output via any indicator. For example, the present disclosure is applicable to a hybrid vehicle with an engine providing an output controlled on a torque basis.

Thus, any hybrid vehicle including an internal combustion engine having a variable valve actuation device for varying an actuation characteristic of an intake valve can benefit from the idea of the present disclosure relating to controlling the engine's output and a controlled target SOC when the actuation characteristic, controlled by the variable valve actuation device, is fixed.

Note that, in the above description, engines 100, 100A correspond in the present disclosure to one embodiment of an internal combustion engine, motor generator MG1 corresponds in the present disclosure to one embodiment of a rotating electric machine, and VVL devices 400, 400A, 400B correspond in the present disclosure to one embodiment of a variable valve actuation device. Furthermore, EGR valve 142 corresponds to one embodiment of a "recirculation valve."

It should be understood that the embodiments disclosed herein are illustrative and non-restrictive in any respect. The scope of the present subject matter is defined by the terms of the claims, rather than the description above, and is intended to include any modifications within the scope and meaning equivalent to the terms of the claims.

What is claimed is:

1. A hybrid vehicle comprising:
an internal combustion engine having a variable valve actuation device for controlling an actuation characteristic of an intake valve, the actuation characteristic being at least one of an amount of lifting the intake valve and a working angle on the intake valve;
a detector configured to detect the actuation characteristic controlled by the variable valve actuation device;
a rotating electric machine configured to generate vehicular driving force;
a power storage device configured to store electric power therein for driving the rotating electric machine; and
a control device configured such that when the actuation characteristic detected by the detector is fixed, the control device sets a range that is applied to set therewithin an output that the internal combustion engine is required to provide to be narrower than when the actuation characteristic is not fixed, and the control device controls an state of charge of the power storage device to be higher than when the actuation characteristic is not fixed.

2. The hybrid vehicle according to claim 1, wherein when the actuation characteristic is fixed with at least one of the amount of lifting the intake valve and the working angle on the intake valve being smaller than a first prescribed value, the control device sets the range to be narrower and controls the state of charge to be higher than when the actuation characteristic is not fixed.

3. The hybrid vehicle according to claim 2, wherein when the actuation characteristic is fixed with the at least one of the amount of lifting the intake valve and the working angle on the intake valve being larger than the first prescribed value, the control device determines the range and controls the state of charge to be equivalent to those applied when the actuation characteristic is not fixed.

4. The hybrid vehicle according to claim 2, wherein when the actuation characteristic is fixed with the at least one of the amount of lifting the intake valve and the working angle on the intake valve being smaller than a second prescribed value smaller than the first prescribed value, the control device sets the range to be further narrower and controls the state of charge to be further higher than when the actuation characteristic is fixed in a state between the first and second prescribed values.

5. The hybrid vehicle according to claim 2, further comprising an exhaust gas recirculation device provided in the internal combustion engine and including a recirculation valve for recirculating a portion of exhaust gas of the internal combustion engine via the recirculation valve to an intake side of the internal combustion engine, wherein when the actuation characteristic is fixed with the at least one of the amount of lifting the intake valve and the working angle on the intake valve being larger than the first prescribed value, the control device determines the range and controls the state of charge to be equivalent to those applied when the actuation characteristic is not fixed, and the control device also holds closed the recirculation valve of the exhaust gas recirculation device.

6. The hybrid vehicle according to claim 1, wherein:
the variable valve actuation device is configured to be capable of switching the actuation characteristic of the intake valve to any one of a first characteristic, a second characteristic allowing at least one of the amount of lifting the intake valve and the working angle on the intake valve to be larger than when the actuation characteristic is the first characteristic, and a third characteristic allowing at least one of the amount and the working angle to be larger than when the actuation characteristic is the second characteristic; and
when the detector detects that the actuation characteristic is fixed at one of the first and second characteristics, the control device sets the range to be narrower and controls the state of charge to be higher than when the actuation characteristic is not fixed.

7. The hybrid vehicle according to claim 6, wherein when the actuation characteristic is fixed at the third characteristic, the control device determines the range and controls the state of charge to be equivalent to those applied when the actuation characteristic is not fixed.

8. The hybrid vehicle according to claim 6, wherein when the actuation characteristic is fixed at the first characteristic, the control device sets the range to be further narrower and controls the state of charge to be further higher than when the actuation characteristic is fixed at the second characteristic.

9. The hybrid vehicle according to claim 6, further comprising an exhaust gas recirculation device provided in the internal combustion engine and including a recirculation valve for recirculating a portion of exhaust gas of the internal combustion engine via the recirculation valve to an intake side of the internal combustion engine, wherein when the actuation characteristic is fixed at the third characteristic, the control device determines the range and controls the state of charge to be equivalent to those applied when the actuation characteristic is not fixed, and the control device also holds closed the recirculation valve of the exhaust gas recirculation device.

10. The hybrid vehicle according to claim 1, wherein:
the variable valve actuation device is configured to be capable of switching the actuation characteristic of the intake valve to any one of a first characteristic and a second characteristic allowing at least one of the amount of lifting the intake valve and the working angle on the intake valve to be larger than when the actuation characteristic is the first characteristic; and
when the detector detects that the actuation characteristic is fixed at the first characteristic, the control device sets the range to be narrower and controls the state of charge to be higher than when the actuation characteristic is not fixed.

11. The hybrid vehicle according to claim 10, wherein when the actuation characteristic is fixed at the second characteristic, the control device determines the range and controls the state of charge to be equivalent to those applied when the actuation characteristic is not fixed.

12. The hybrid vehicle according to claim 10, further comprising an exhaust gas recirculation device provided in the internal combustion engine and including a recirculation valve for recirculating a portion of exhaust gas of the internal combustion engine via the recirculation valve to an intake side of the internal combustion engine, wherein when the actuation characteristic is fixed at the second characteristic, the control device determines the range and controls the state of charge to be equivalent to those applied when the actuation characteristic is not fixed, and the control device also holds closed the recirculation valve of the exhaust gas recirculation device.

* * * * *

UNITED STATES PATENT AND TRADEMARK OFFICE
CERTIFICATE OF CORRECTION

PATENT NO. : 9,725,085 B2  
APPLICATION NO. : 15/117778  
DATED : August 8, 2017  
INVENTOR(S) : Ryuta Teraya et al.

Page 1 of 1

It is certified that error appears in the above-identified patent and that said Letters Patent is hereby corrected as shown below:

On the Title Page

Item (54) and in the Specification, in Column 1, Title, delete:
"HYBRID VEHICLE WITH VARIABLE VALVE TIMING FAILURE DETECTION WITH CONSEQUENT REDUCTION OF ENGINE OUTPUT RANGE RANGE AND INCREASE OF THE STATE OF CHARGE"

And insert:
-- HYBRID VEHICLE WITH VARIABLE VALVE TIMING FAILURE DETECTION WITH CONSEQUENT REDUCTION OF ENGINE OUTPUT RANGE AND INCREASE OF THE STATE OF CHARGE --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*